(12) United States Patent
Alexander et al.

(10) Patent No.: US 6,583,911 B1
(45) Date of Patent: Jun. 24, 2003

(54) OPTICAL COMMUNICATIONS BY FREQUENCY CONTENT OF FEMTOSECOND LASER PULSES

(76) Inventors: Dennis R. Alexander, 5701 Rokeby Rd., Lincoln, NE (US) 68516; Mark L. Rohlfs, 6601 Comet Cir. #204, Springfield, VA (US) 22150

( * ) Notice: Subject to any disclaimer, the term of this patent is extended or adjusted under 35 U.S.C. 154(b) by 124 days.

(21) Appl. No.: 09/684,121

(22) Filed: Oct. 6, 2000

Related U.S. Application Data

(60) Provisional application No. 60/157,949, filed on Oct. 6, 1999.

(51) Int. Cl.[7] .............................................. H04B 10/04
(52) U.S. Cl. ...................... 359/184; 359/172; 359/189
(58) Field of Search ................................ 359/154, 172, 359/184; 372/26; 375/238; 332/109; 329/312

(56) References Cited

U.S. PATENT DOCUMENTS

| | | | |
|---|---|---|---|
| 4,957,337 A | 9/1990 | Ogawa et al. | 350/96.13 |
| 5,091,980 A | 2/1992 | Ogawa et al. | 385/3 |
| 5,390,202 A | 2/1995 | Yan et al. | 372/26 |
| 5,828,474 A | 10/1998 | Prucnal et al. | 359/123 |
| 5,907,421 A | 5/1999 | Warren et al. | 359/180 |
| 6,043,920 A | * 3/2000 | Leopold et al. | 359/184 |
| 6,172,793 B1 | 1/2001 | Heberle et al. | 359/264 |
| 6,175,437 B1 | 1/2001 | Diels et al. | 359/180 |

OTHER PUBLICATIONS

Attosecond pulse generation using high–order harmonics; conference on Lasers and Electro–Optics Europe 1998; Sep. 14–18, 1998, p. 107; Suda, A., et al.

Generation and Propagation of Attosecond Pulse in He Gas with Sub–10–fs Driver Pulses; The Pacific Rim Conference on Lasers and Electro–Optics 1999; Aug. 30–Sep. 3, 1999; vol. 3, pp. 668–669; Shon, N. H., et al.

Phase–matched generation of coherent x–rays; summaries of papers presented at the conference on Lasers and Electro–Optics 1999; May 23–38, 1999; pp. 248–249; Durfee III, C., et al.

Measurement of ~ 10fs XUV pulses from high–order harmonic generation; summaries of papers presented at the conference on Lasers and Electro–Optics 1999; May 23–28, 1999; pp. 343–344; Chang, Z., et al.

* cited by examiner

*Primary Examiner*—Leslie Pascal
*Assistant Examiner*—Christina Y. Leung

(57) ABSTRACT

A free-space optical communications system is provided capable of transmitting data over long distances through the atmosphere. The communications system according to the present invention comprises an optical transmitter at a first location, the optical transmitter comprising a femtosecond pulsed laser source for producing a train of femtosecond laser pulses. The optical transmitter further comprises a laser pulse width modulator to provide a pulse width modulated train of femtosecond laser pulses corresponding to the data being transmitted. The communications system further comprises an optical receiver at a second location for receiving the modulated train of femtosecond laser pulses. The optical receiver comprises a spectral analyzer for detecting the spectral components of the pulse width modulated train of femtosecond laser pulses. The optical receiver further comprises decoder circuitry operable to replicate the transmitted data based on the spectral components of the modulated train of femtosecond laser pulses. In another aspect, a method for optically transmitting data employing the optical communication system according to the present invention is provided.

25 Claims, 20 Drawing Sheets

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

No spray without averaging.

No spray with averaging.

Spray without averaging

Spray with averaging

Narrow bandwidth.

Medium bandwidth.

Wide bandwith.

Narrow bandwidth.

Medium bandwidth.

Wide bandwith.

Narrow bandwidth.

Medium bandwidth.

Wide bandwith.

Full spray.

Medium spray.

Light Spray.

OPTICAL COMMUNICATIONS BY FREQUENCY CONTENT OF FEMTOSECOND LASER PULSES

This Application claim benefit to Provisional Application 60/157,949 Oct. 6, 1999.

FIELD OF THE INVENTION

The present invention relates generally to an optical communications apparatus and method and, more particularly, to a free space optical communications apparatus and method that may be employed to transmit information long distances through the atmosphere.

BACKGROUND OF THE INVENTION

Free space optical communications are of considerable interest for satellite-to-satellite communications (satellite crosslinks) since the region between satellites (the communications channel) is ideal, essentially a vacuum, which does not distort or attenuate the light beam. For earth-to-satellite and satellite-to-earth communications, on the other hand, the Earth's atmosphere strongly influences the light transmission between information source and the destination. In such cases, (except for very short transmission paths) the transmission reliability of free-space optical transmission systems is considered unsatisfactory for most communications purposes.

There does not exist in the art a free-space optical communications system that can transmit data between the earth and a satellite, or that can otherwise transmit data long distances through the atmosphere.

SUMMARY OF THE INVENTION

The present invention comprises a free-space optical communications system capable of transmitting data over long distances through the atmosphere. The communications system according to the present invention comprises an optical transmitter at a first location, the optical transmitter comprising a femtosecond pulsed laser source for producing a train of femtosecond laser pulses having a pulse width in the range of from about 1 attosecond to about 1000 femtoseconds. The optical transmitter further comprises a laser pulse width modulator to provide a pulse width modulated train of femtosecond laser pulses corresponding to the data being transmitted. The communications system according to the present invention further comprises an optical receiver at a second location for receiving the modulated train of femtosecond laser pulses. The optical receiver comprises a spectral analyzer for receiving and determining the spectral components of the pulse width modulated train of femtosecond laser pulses. The optical receiver further comprises decoder circuitry operable to replicate the transmitted data based on the spectral components, i.e., frequency or wavelength content, of the modulated train of femtosecond laser pulses. It has been found in accordance with the present invention that the spectral characteristics of the femtosecond pulses of given initial pulse width are retained, even where considerable pulse width broadening has occurred upon transmission. In one embodiment, the optical communications system according to the present invention is adapted for transmission through the atmosphere, such as an earth-earth communication link, including long distance earth-earth links, and earth-satellite communication link. In another embodiment, the optical communications system is adapted for transmission through a media which is essentially a vacuum, such as a satellite-satellite communication link. In still another embodiment the transmission medium may be a fiber optic link.

In another aspect, a method for optically transmitting data employing the optical communication system according to the present invention is also provided.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

The present invention is a free-space optical communications system for transmitting information in the form of pulse width modulated laser pulses, wherein the pulse width is on the order of femtoseconds in duration. Lasers capable of generating pulses on the order of femtoseconds are known in the art and are commercially available. Common examples include dye lasers with compressed pulse means. In exemplary embodiments of the optical communications apparatus and method according to the present invention, the femtosecond pulse laser energy emitter employed is an amplified Ti:sapphire femtosecond laser or a colliding pulse mode (CPM) laser. In one embodiment an actively stabilized argon laser (Coherent Innova 306 Argon Laser) is used to pump the femtosecond laser to produce a very stable femtosecond pulse. See also, Murname et al., "The Recent Revolution in Femtosecond Lasers," *IEEE LEOS Newsletter*, August 1993, p. 17; Glanz, "Short-Pulse Lasers Deliver Terawatts on a Tabletop," *R&D Magazine*, April 1993, p. 54; and especially, Messenger, "Technology of Ultrafast Lasers and Electro-Optics Expands Rapidly," *Laser Focus World*, September 1993, p. 69. An overview of ultrafast laser sources is also described in commonly owned copending U.S. patent application Ser. No. 08/193,371, filed Feb. 7, 1994, which is hereby incorporated by reference in its entirety.

Figure 1:
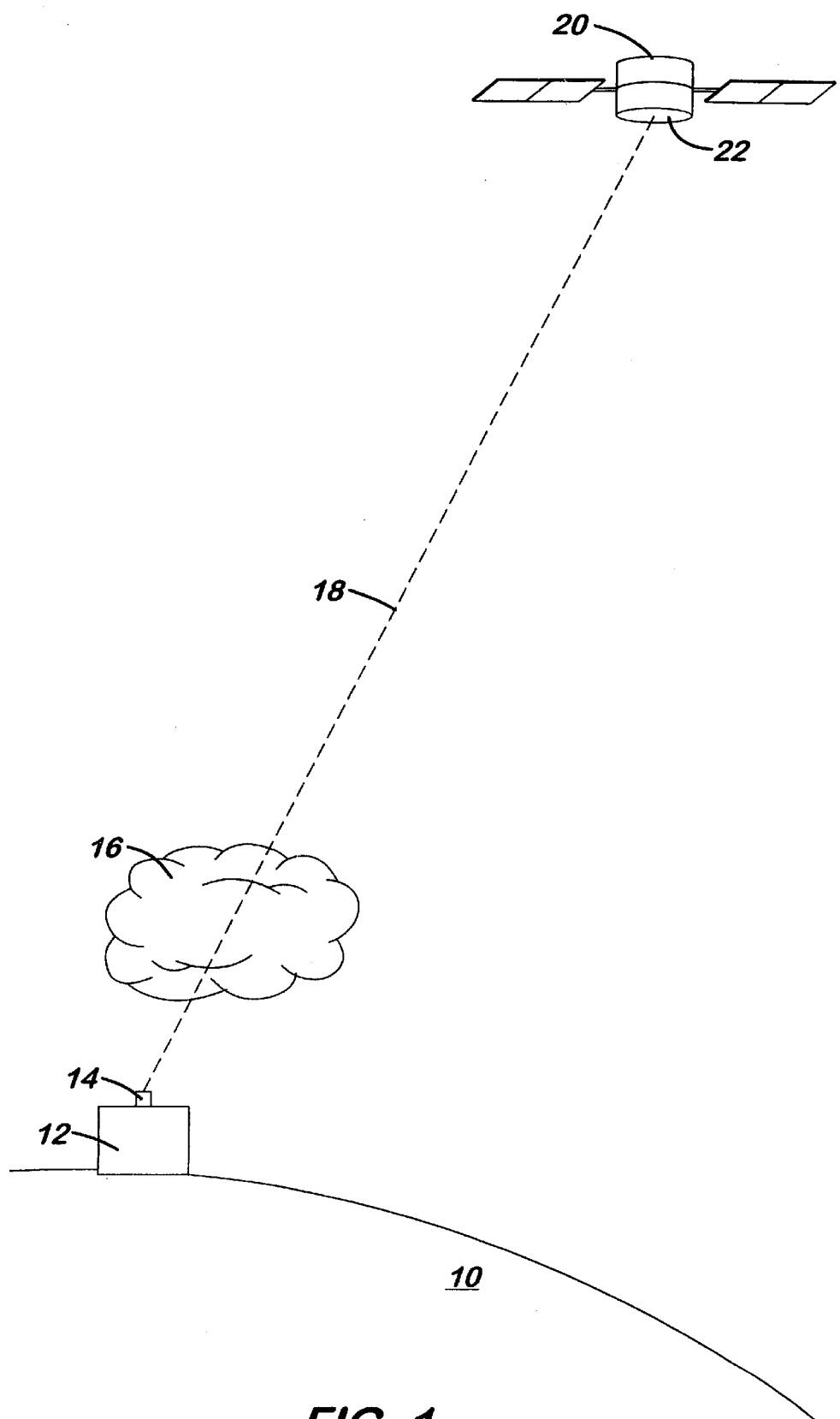
FIG. 1 is a pictorial depiction of an embodiment of the free-space optical communications system according to the present invention.

FIG. 1 is a pictorial depiction of an embodiment of the free-space optical communications system according to the present invention for transmitting data between the Earth 10 and an orbiting communications satellite 20 in the form of pulse width modulated laser pulses that are transmitted via optical transceiver 14 located within ground station 12 and optical transceiver (22) located on satellite 20. As will be discussed herein, it has been found in accordance with the present invention that the frequency content of femtosecond pulses is not changed by the presence aerosol particles in the path of transmission, represented pictorially by cloud 16 in the diagram of FIG. 1.

In one embodiment, the optical data link provided by the system according to the present invention, is bidirectional, wherein both ground station 12 and satellite 20 comprise femtosecond laser pulse transmitters as well as optical receivers operable to collect and analyze the frequency components of received femtosecond pulsed transmissions. In another embodiment, the optical data link provided by the optical communications system according to the present invention provides an optical uplink wherein a ground based optical transmitter 14 is employed to transmit the communication transmission 18 to optical receiver 22 on satellite 20. In this manner data may be transmitted to satellite 20 for downlink transmission to the appropriate destination or destinations via conventional RF and microwave frequency bands and transmission means. Conversely, in another embodiment, the optical data link provided by the optical communications system according to the present invention may provide an optical downlink wherein a satellite based optical transmitter 22 is employed to transmit the communication transmission 18 from satellite 20 to a ground based optical receiver 14. In this manner data may be transmitted to ground station 12 for transmission to the appropriate destination via conventional RF and microwave frequency bands and transmission means.

It will be recognized that the communications system according to the present invention may likewise be employed to provide a communications link between any two ground based stations having a line of sight communication transmission path through the atmosphere available (e.g., hilltop to hilltop transmissions, tower to tower transmissions, and so forth). Of course, it will be recognized that the optical communications system and method employing pulse width modulated femtosecond laser pulses are also functional and useful for the transmission of information over any optical transmission media, including media that are suitable for conventional optical data transmission, such as optical fibers, vacuums or near vacuums (e.g., for inter-satellite communication crosslinks), or short distances through the atmosphere. However, in such cases, the attenuation of the laser pulses would be expected to be sufficiently low so as to render a frequency analysis of the pulses unnecessary or redundant.

Figure 2:
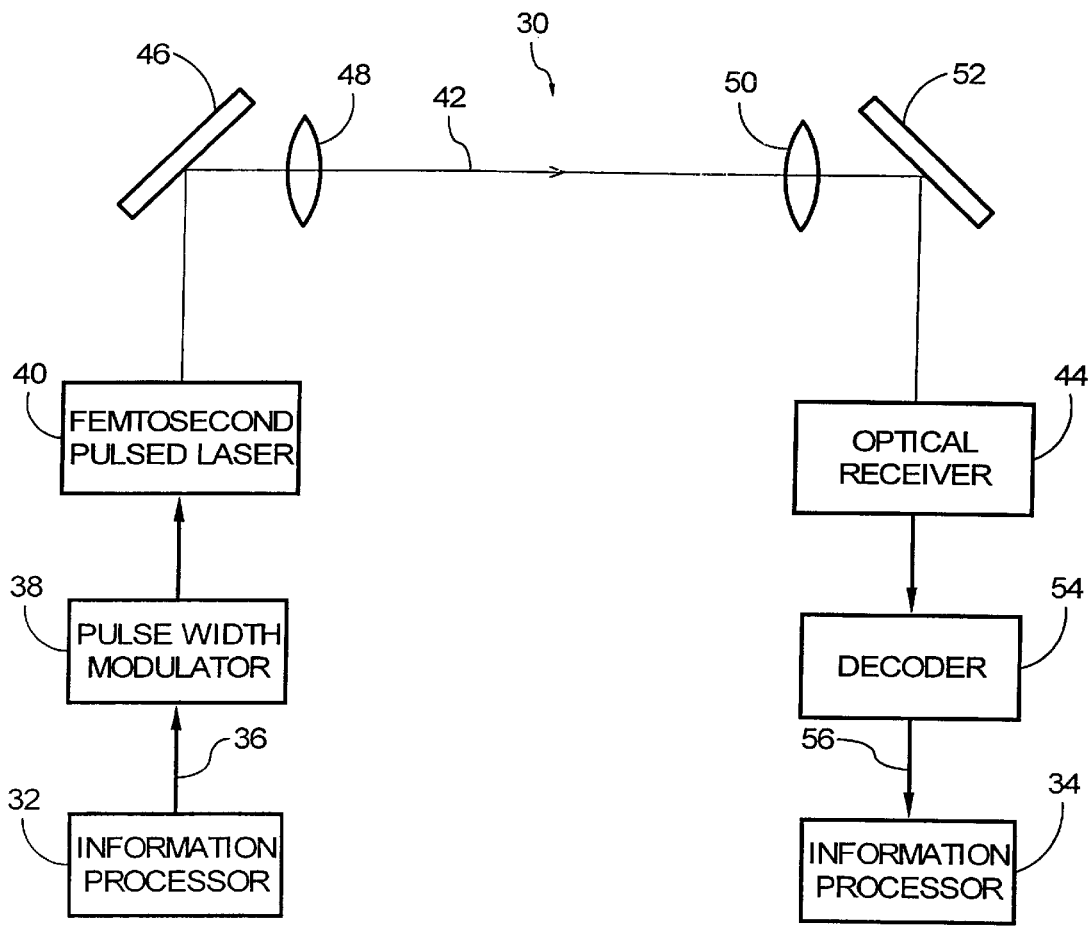
FIG. 2 is a block diagram of an optical communications system 30 in accordance with the present invention.

FIG. 2 shows a block diagram of an optical communications system 30 in accordance with the present invention. Information processor 32 receives information encoded in a digital format to be transmitted to a second information processor 34. The encoded information may be of any type that is transmitted over communications networks, including online data, digitized audio and/or video data to be sent to specific network users or broadcast to multiple users, and so forth. The information may also be derived from any suitable source, such as by demodulating a modulated RF or microwave transmission.

The encoded information is sent as a digitally formatted electrical signal 36 to pulse width modulator means 38. Pulse width modulator means 38 comprises circuitry operable to modulate the pulse width of laser energy pulses produced by femtosecond pulsed laser 40 to produce a pulse width modulated train of laser energy emissions 42.

The pulse width modulated femtosecond pulse train 42 is directed to optical receiver 44. Any known means for aiming the pulsed laser energy emissions to be received by optical receiver 44 may be employed. The means for directing the laser pulses are represented schematically by mirror 46, transmitting lens 48, collecting lens 50, and mirror 52, however, such directing means may include methods of delivering or steering the laser energy to receiver 44, such as mirrors, lenses, prisms, diffraction gratings, optical fibers, optical crystals, optical filters, and the like, and arrangements and combinations thereof. The elements of the light directing means should preferably mounted so as to be capable of precise positioning and aiming i.e., finely rotatable about three perpendicular axes and/or translatable in order to provide the fine degree of alignment necessary given the narrow beam widths and long distances (i.e., earth-satellite distances) involved.

Optical receiver 44 may employ any method known by persons skilled in the art for determining the wavelength or frequency components of the received laser pulses. Such methods include, but are not limited to, detecting interferometric patterns of Fizeau interferometers, detection of a diffraction pattern produced by a diffraction grating, e.g., via an optical multichannel analyzer, and so forth.

Optical receiver 44 sends frequency content (wavelength bandwidth) data for the received pulses to decoder circuitry 56 which, in turn, generates a digitally formatted electrical signal 56 encoding information (using a data encoding scheme that may be the same as or different from that signal 36) that replicates the transmitted information (using a data encoding scheme that may be the same as or different from that signal 36). In one embodiment according to the present invention, a store and forward type of system is operable to embody the present invention, wherein the data encoded by digitally formatted electrical signal 56 is stored in a memory location (not shown) for later forwarding. In another embodiment, repeater type of system is operable to embody the present invention, wherein the digitally formatted electrical signal immediately forwarded to the appropriate destination or destinations, with demultiplexing as necessary in the case of a multiplexed system. The forwarding transmissions of the information transmitted by the apparatus 30 of FIG. 2 may be performed by a further optical transmission in accordance with the present invention wherein the receiving station further comprises a pulse width modulated femtosecond transmitting apparatus (not shown) as described in FIG. 2. For example, where the optical transmission described by way of reference to FIG. 2 is a ground to satellite communication, the forwarding transmissions may be made via a satellite-to-earth optical link of the same type described in FIG. 2, or may be made via a conventional satellite-to-earth downlink (e.g., via modulated RF or microwave carriers) or conventional intersatellite crosslink.

The beam width of a laser source will be much smaller than even the beam width of even the most highly directive antenna gain patterns. In implementing the optical system in accordance with the present invention over long distance free space paths, precise pointing and beam tracking are necessary to provide the proper alignment for the optical transmission. Optical pointing procedures are generally known in the art, for example of the type suitable for use with for use with satellite-satellite optical crosslinks. Such methods include, in addition to overall satellite positioning and orientation, optical beacon autotracking methods and the like. In an optical satellite autotracking system, a transmitting station, such as a ground-based station aims its optical beam toward the satellite by tracking the arrival of an optical beam from the satellite. The arriving optical field direction may be tracked using a quadrant array of detectors wherein the arriving field is focused to a spot on the quadrant array. In this manner, pointing error voltages can be generated in azimuth and elevation by combining the quadrant outputs, wherein the error voltages are proportional to the displacement of the focused spot from the center of the array. The error signals may be fed back to control laser pointing (or the light directive optics) to keep the focused spot at the center of the array. A separate tracking beacon and communications signal may be provided, or, a beam splitter may be employed so that a portion of the transmitted signal itself may used as the tracking beacon.

In one embodiment, the optical communications apparatus in accordance with the present invention provides a periodic pulse train to transmit binary encoded data representative of information to be transmitted. The information may be online data, digitized audio or video signals, and so forth. The information is output to modulator which is used to control the duty cycle time of the femtosecond pulses. Two discrete pulse widths may be used to represent logical binary on and off states. In one embodiment, the modulated pulse widths may both vary from the pulse width of the unmodulated femtosecond pulse train. In another embodiment, the pulse width of the baseband (unmodulated) signal pulses and modulated pulses may be one of the discrete pulse widths. In this manner, the pulse width is modulated by modulating the pulses that correspond to one of the two binary values. Modulation may be employed to providing a pulse of either longer or shorter duration than the baseband pulse widths, and will generally depend on the pulse width chosen for the unmodulated pulse train. The pulse width modulation may be performed on the leading edge, trailing edge, or both.

EXAMPLES

1. Introduction

Experiments were conducted to investigate the fundamentals of femtosecond laser pulse propagation through aerosol sprays simulating transmission through clouds. In addition, comparisons with continuous wave laser propagation through aerosol sprays are made when applicable. Results of the femtosecond propagation studies include transmitted power, temporal stretching, and bandwidth preservation.

2. Theory of Scattering Through Aerosol Particles

Figure 4A:
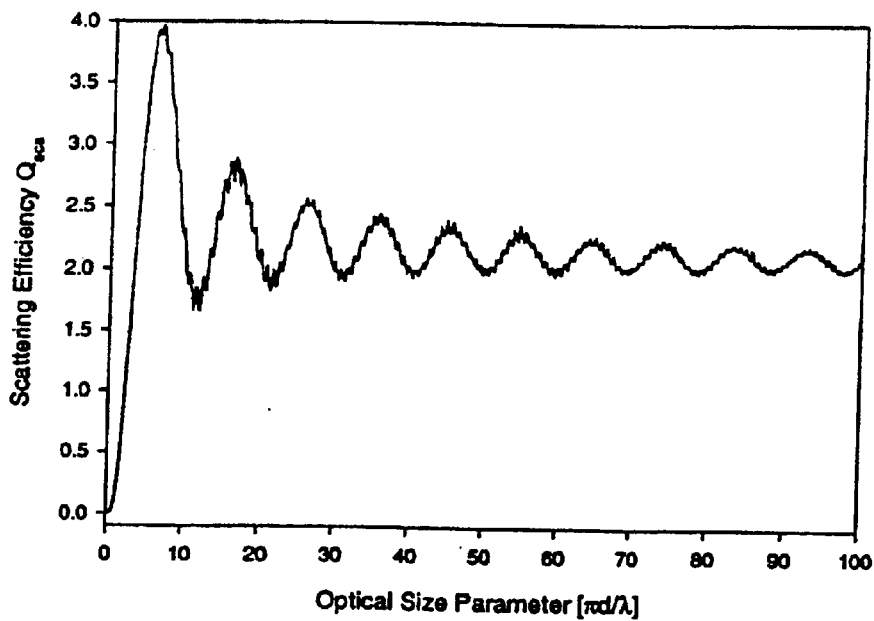
FIGS. 4A and 4B are plots of the theoretical scattering efficiency as a function of the optical size parameter $2\pi a/\lambda$ and as a function of particle diameter, respectively.
Figure 4B:
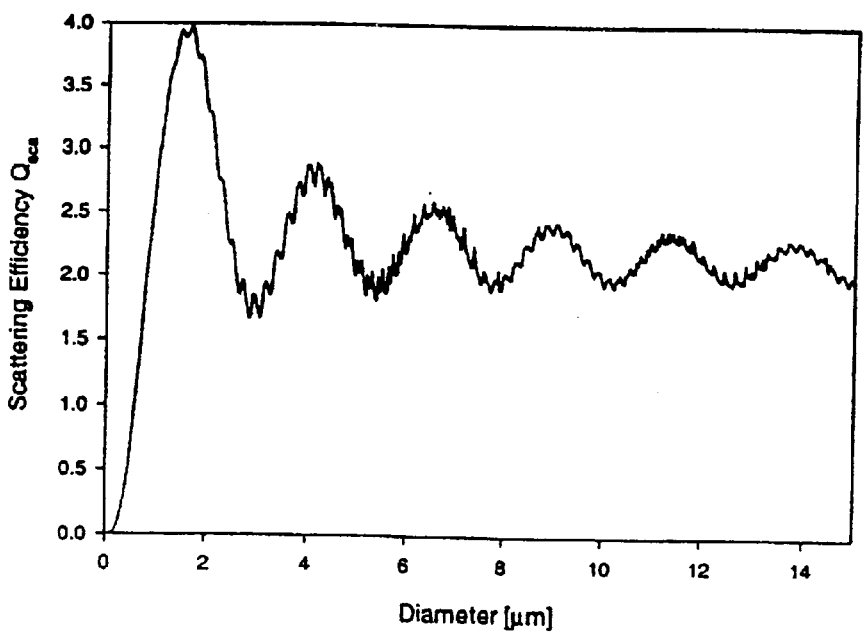
Figure 5A:
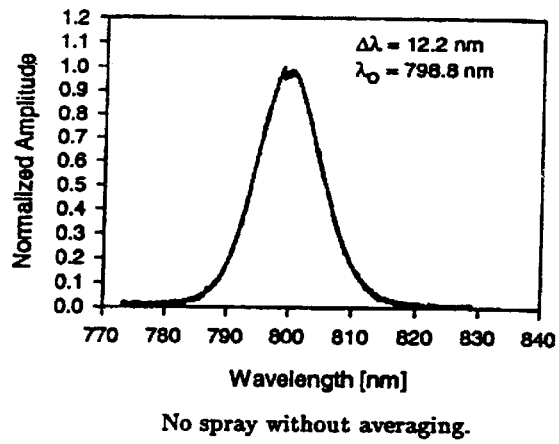
FIGS. 5A–5D are graphs showing wavelength comparison for narrow bandwidth pulse (Day 1 data)
Figure 5B:
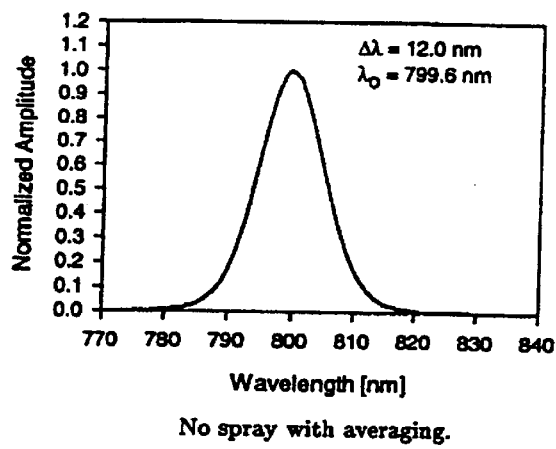
Figure 5C:
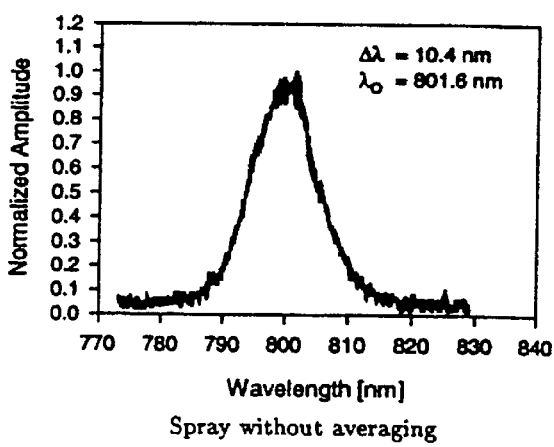
Figure 5D:
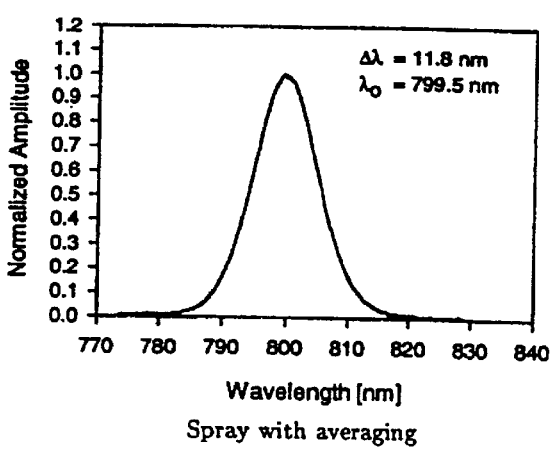
Figure 6A:
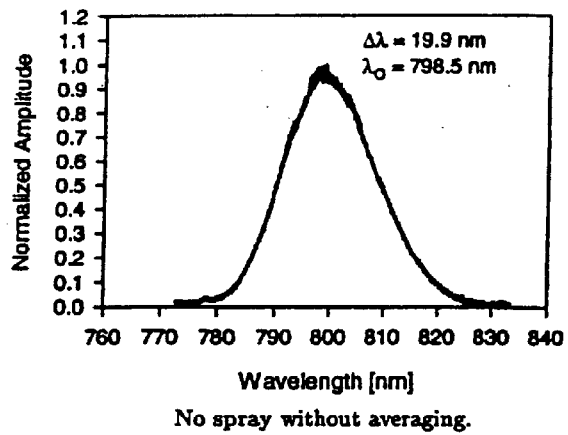
FIGS. 6A–6D are graphs showing wavelength comparison for medium bandwidth pulse (Day 1 data)
Figure 6B:
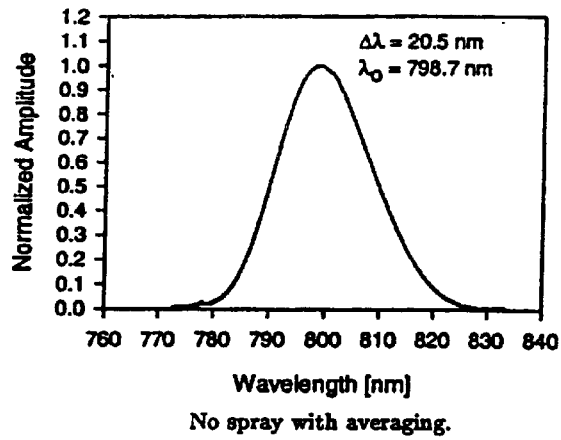
Figure 6C:
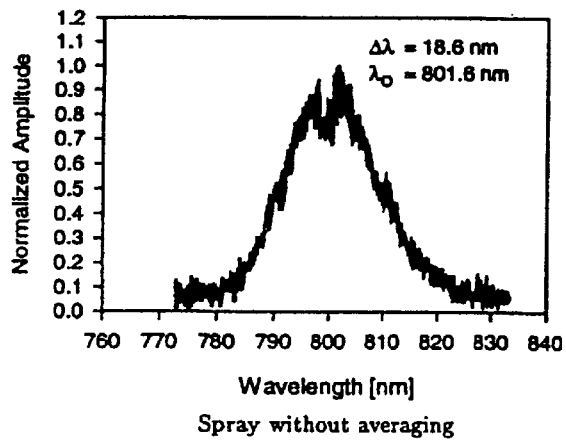
Figure 6D:
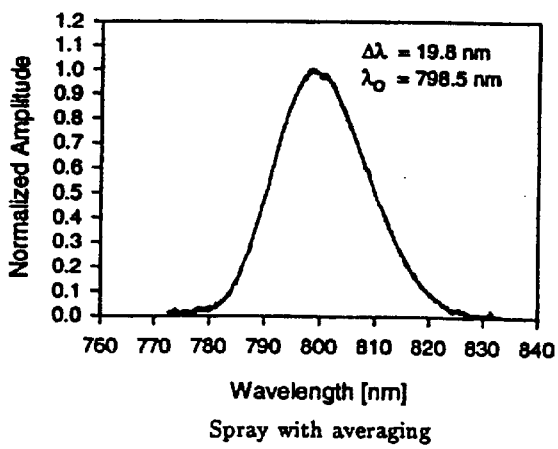
Figure 7A:
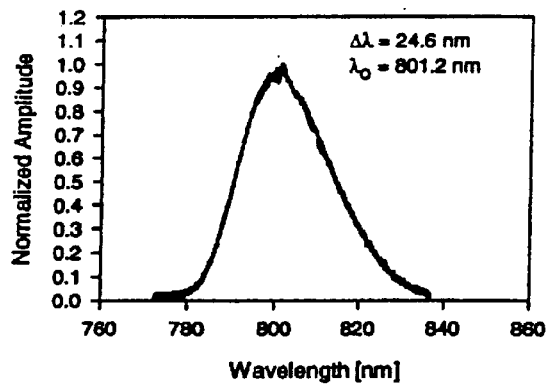
FIGS. 7A–7D are graphs showing wavelength comparison for wide bandwidth pulse (Day 1 data)
Figure 7B:
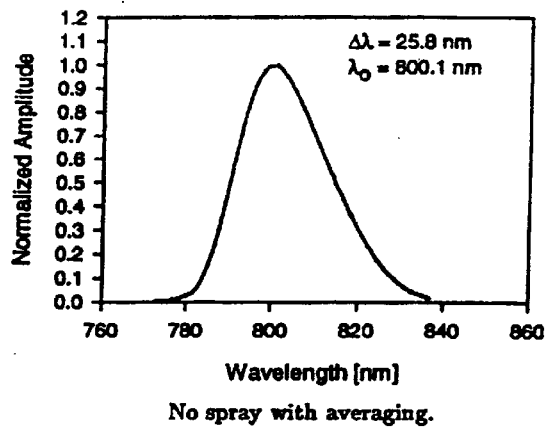
Figure 7C:
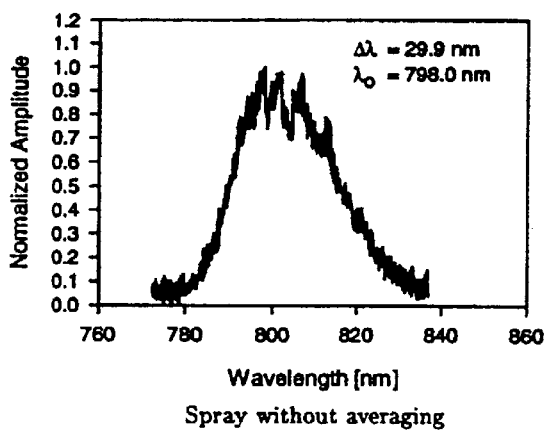
Figure 7D:
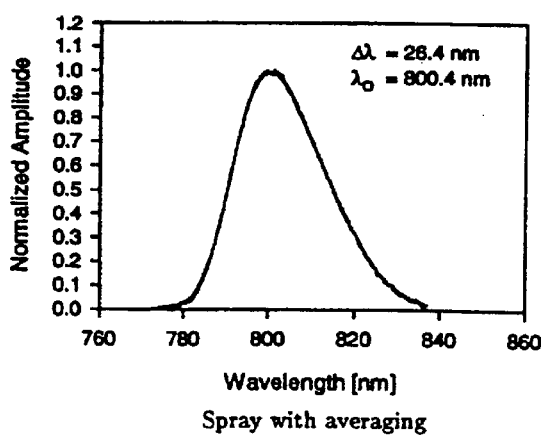
Figure 8A:
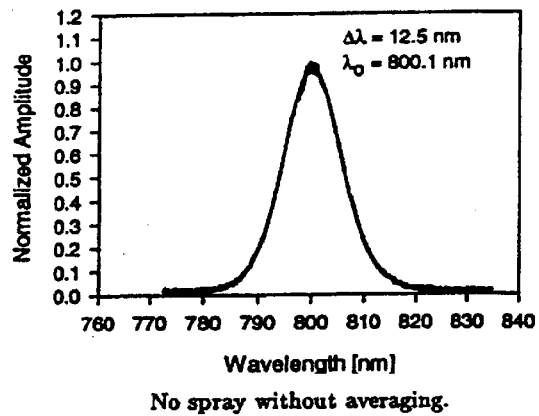
FIGS. 8A–8D are graphs showing wavelength comparison for narrow bandwidth pulse (Day 2 data)
Figure 8B:
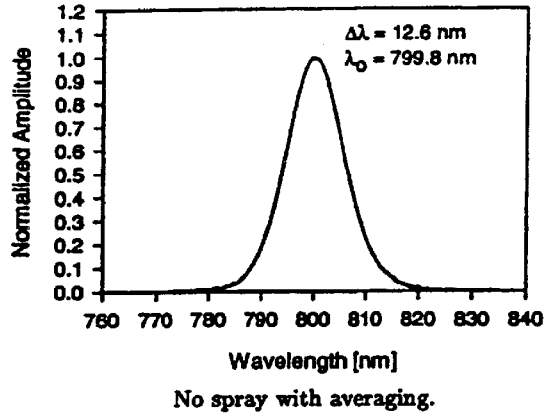
Figure 8C:
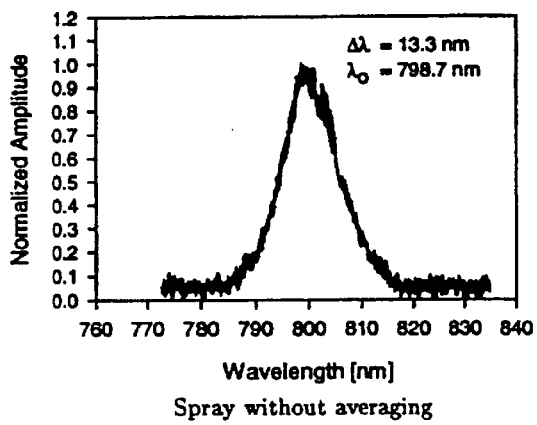
Figure 8D:
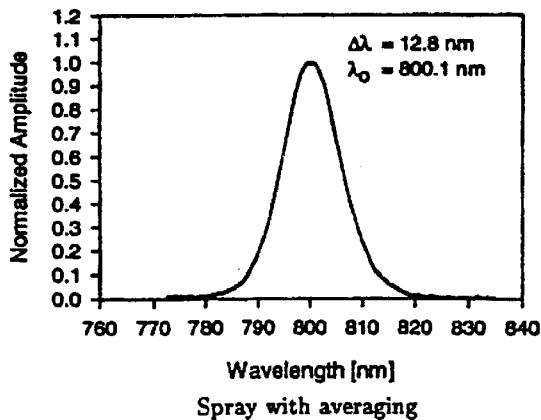
Figure 9A:
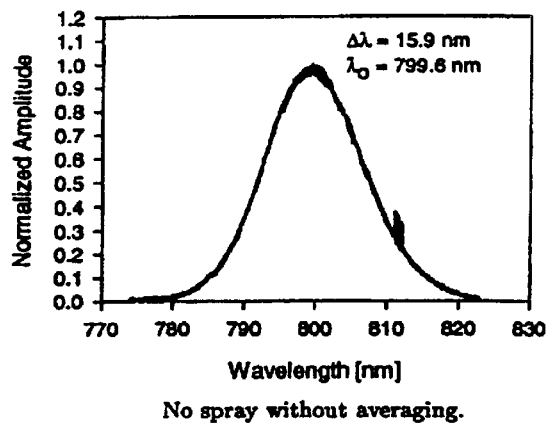
FIGS. 9A–9D are graphs showing wavelength comparison for medium bandwidth pulse (Day 2 data)
Figure 9B:
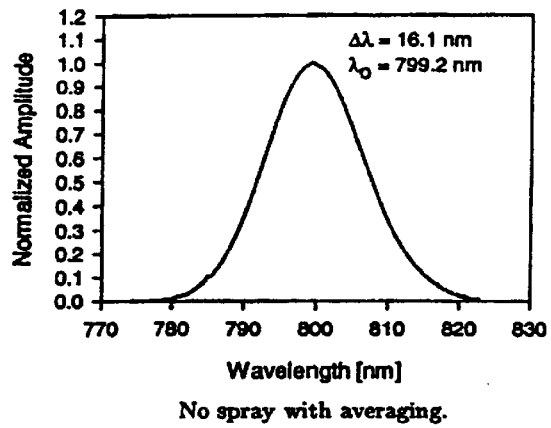
Figure 9C:
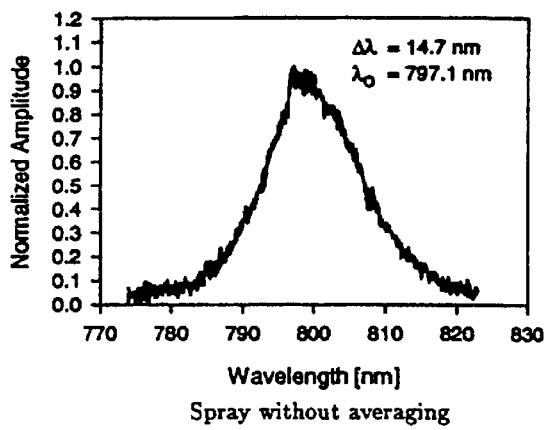
Figure 9D:
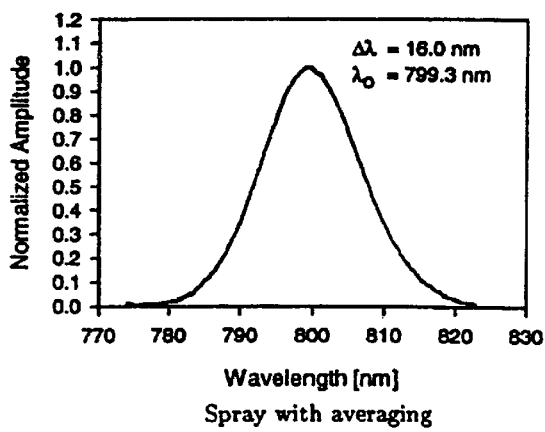
Figure 10A:
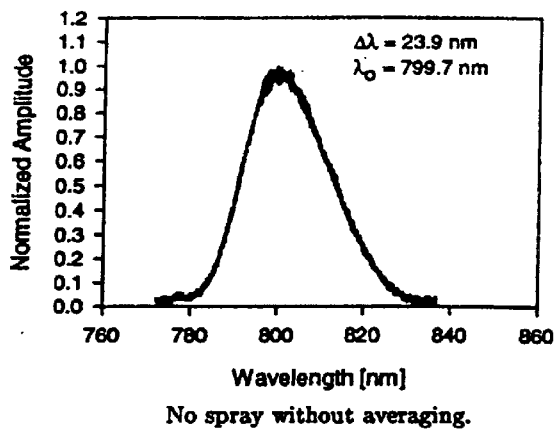
FIGS. 10A–10D are graphs showing wavelength comparison for wide bandwidth pulse (Day 2 data)
Figure 10B:
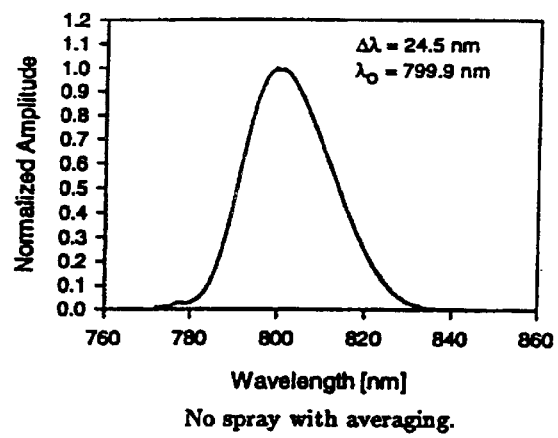
Figure 10C:
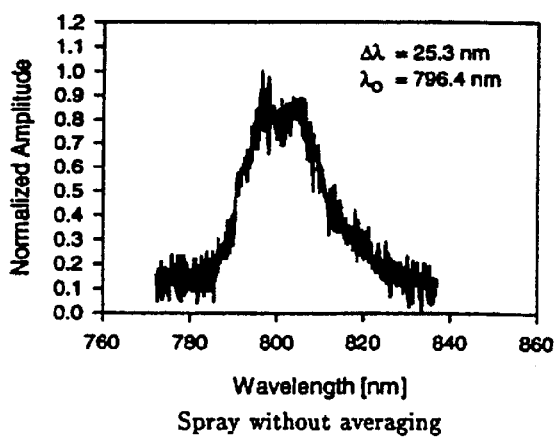
Figure 10D:
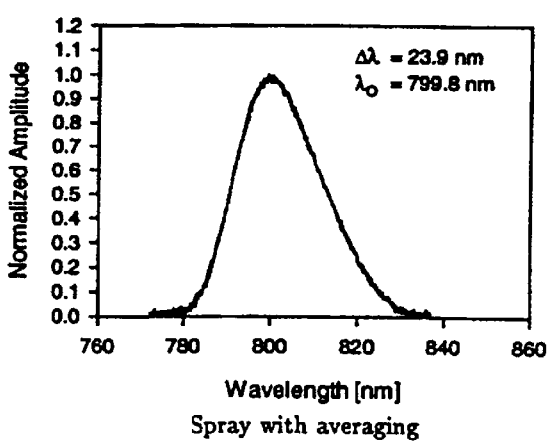
Figure 11A:
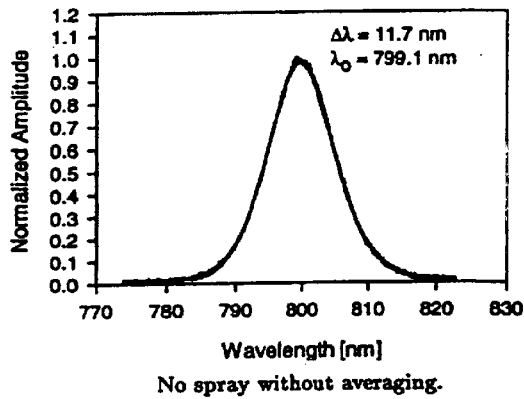
FIGS. 11A–11D are graphs showing wavelength comparison for narrow bandwidth pulse (Day 3 data)
Figure 11B:
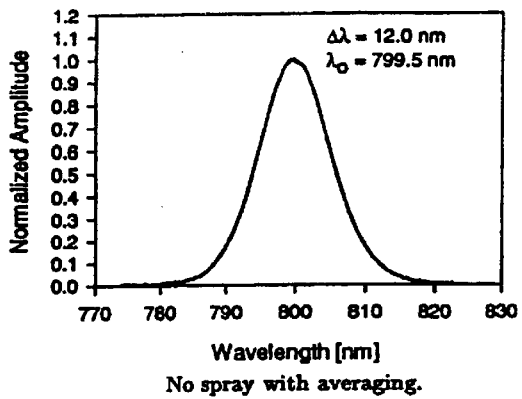
Figure 11C:
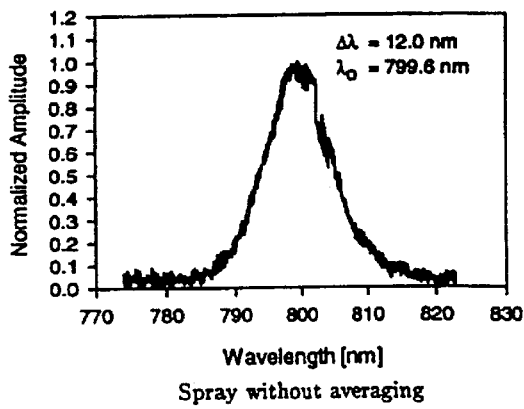
Figure 11D:
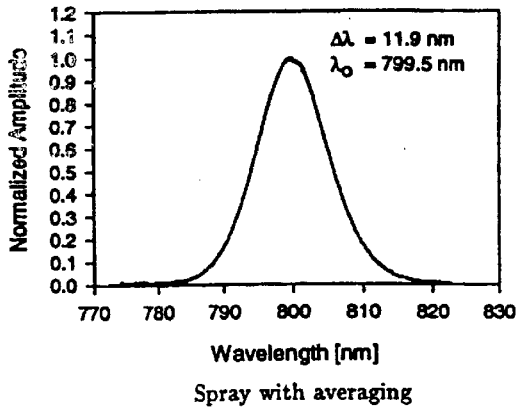
Figure 12A:
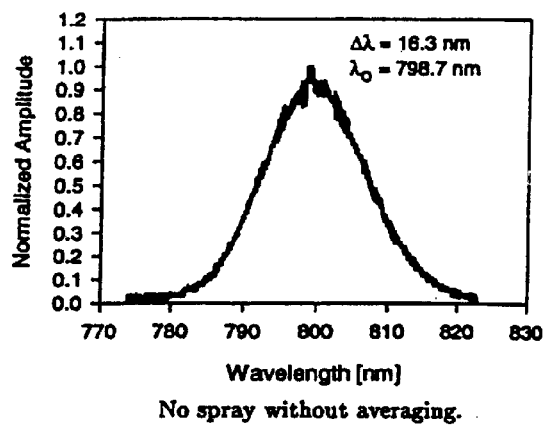
FIGS. 12A–12D are graphs showing wavelength comparison for medium bandwidth pulse (Day 3 data)
Figure 12B:
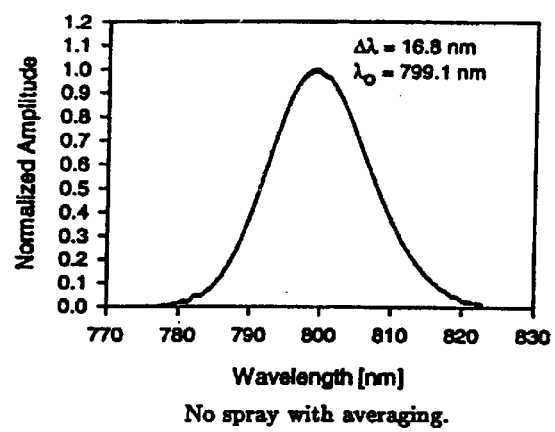
Figure 12C:
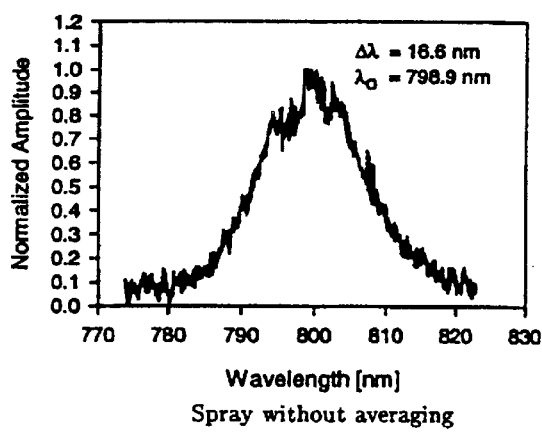
Figure 12D:
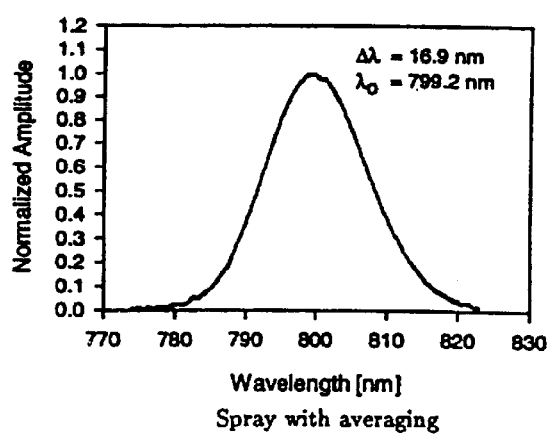
Figure 13A:
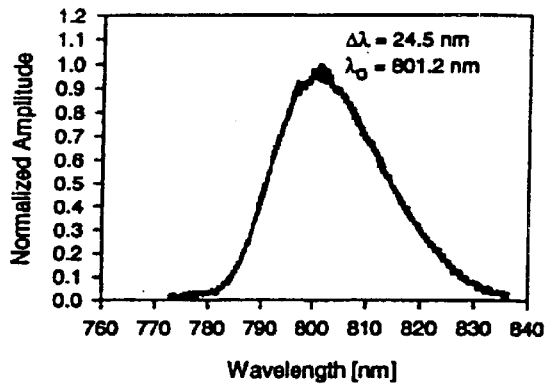
FIGS. 13A–13D are graphs showing wavelength comparison for wide bandwidth pulse (Day 2 data)
Figure 13B:
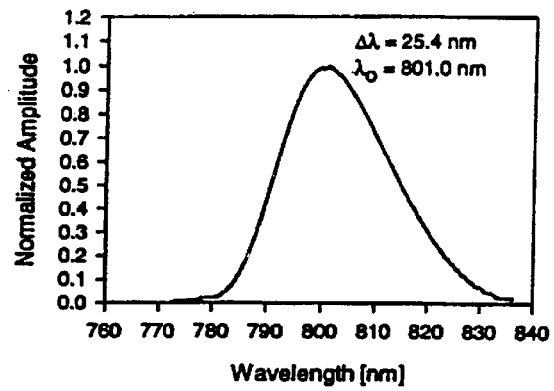
Figure 13C:
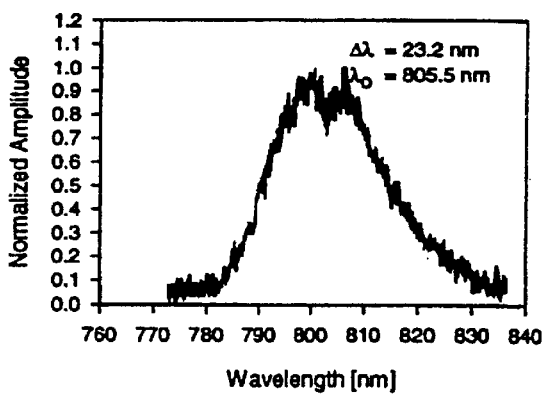
Figure 13D:
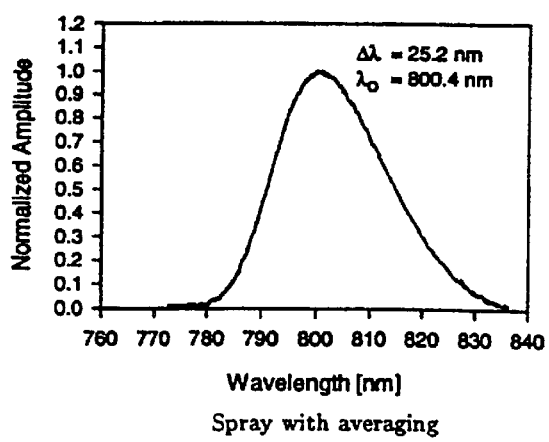
Figure 14A:
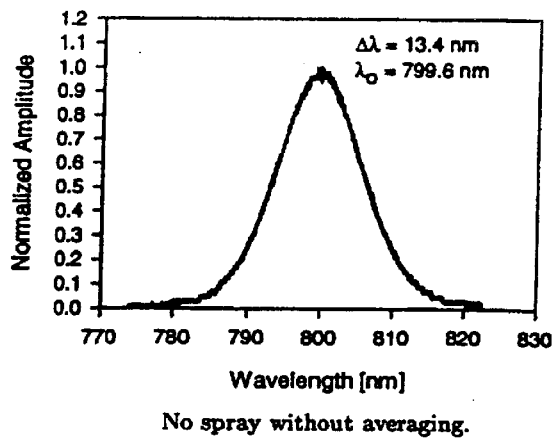
FIGS. 14A–14D are graphs showing wavelength comparison for high density aerosol spray.
Figure 14B:
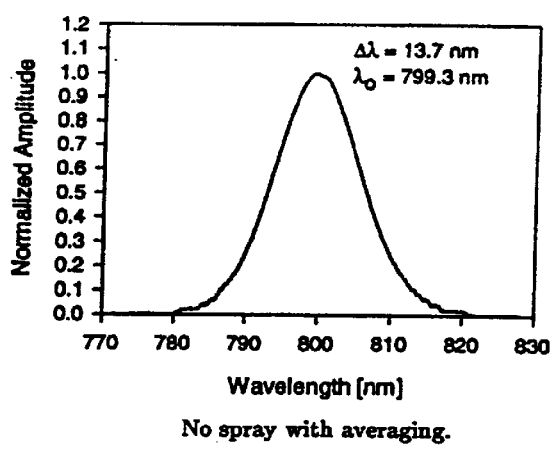
Figure 14C:
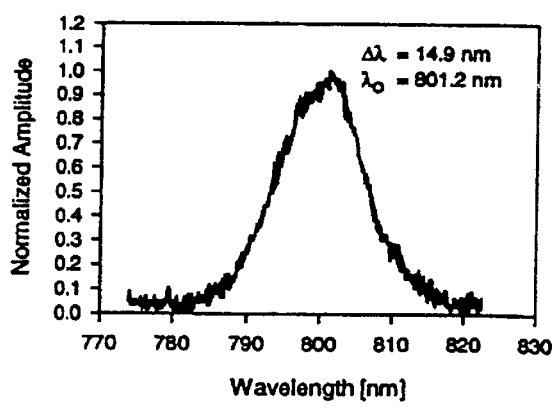
Figure 14D:
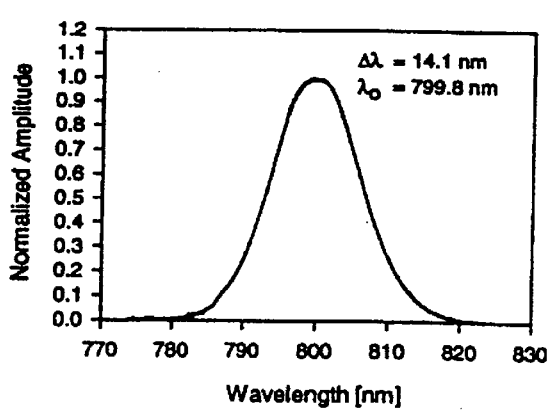
Figure 15A:
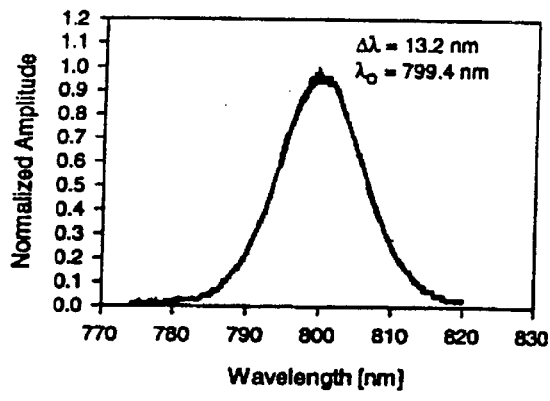
FIGS. 15A–15D are graphs showing wavelength comparison for medium density aerosol spray.
Figure 15B:
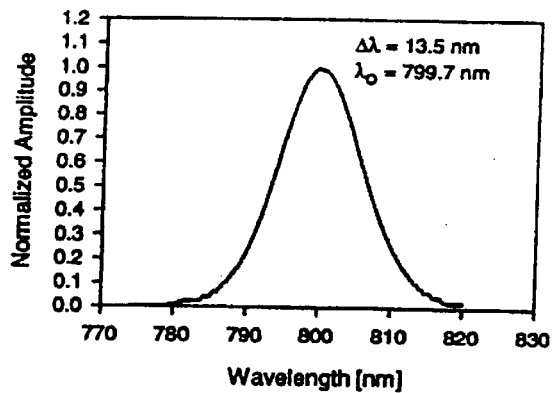
Figure 15C:
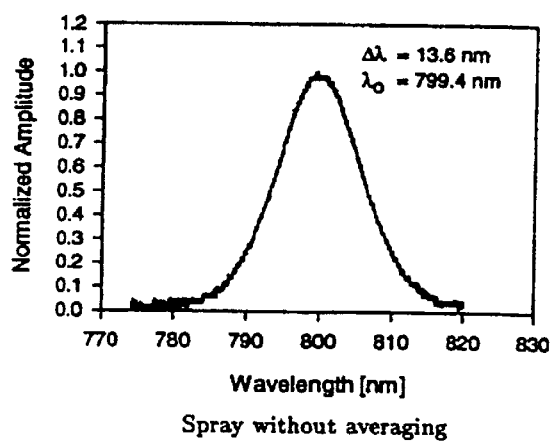
Figure 15D:
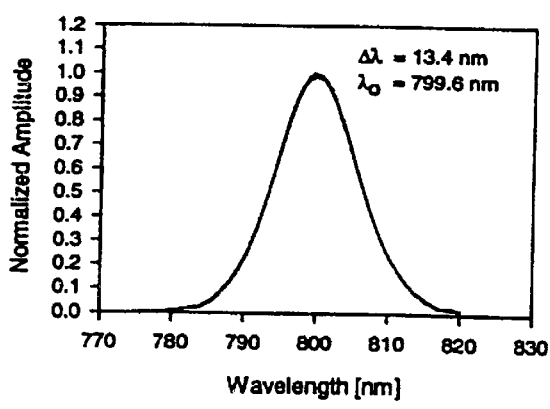
Figure 16A:
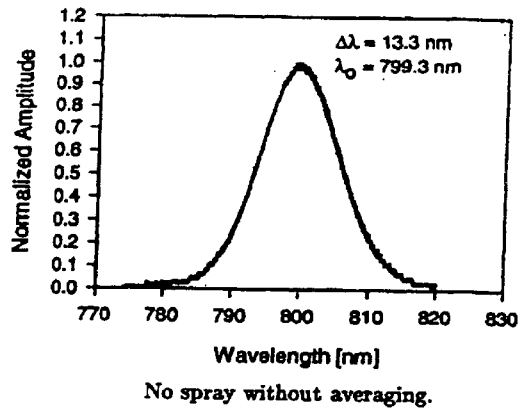
FIGS. 16A–16D are graphs showing wavelength comparison for low density aerosol spray.
Figure 16B:
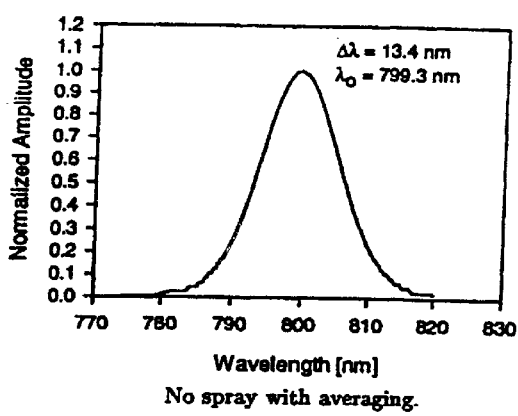
Figure 16C:
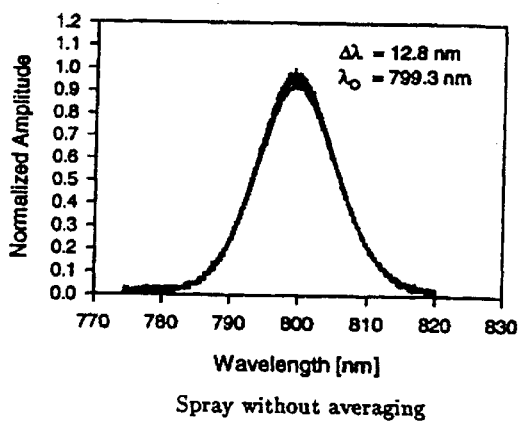
Figure 16D:
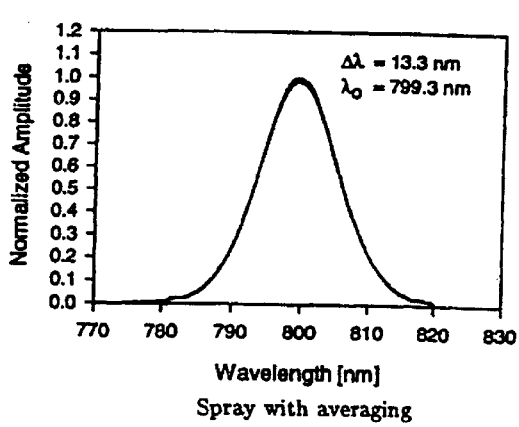
Figure 17A:
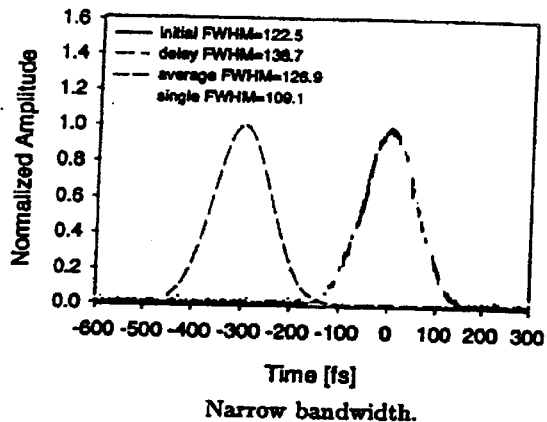
FIGS. 17A–17C are graphs showing pulse length results for Experiment 1 (Day 1 data)
Figure 17B:
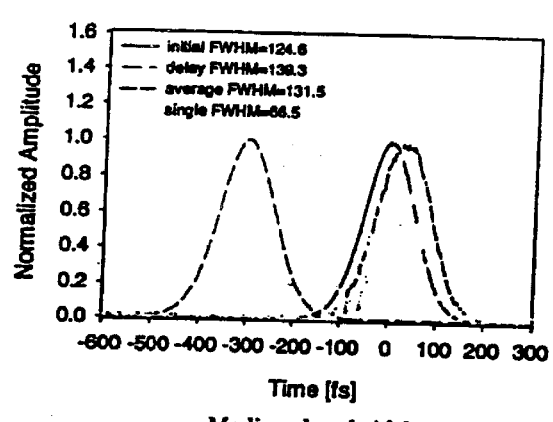
Figure 17C:
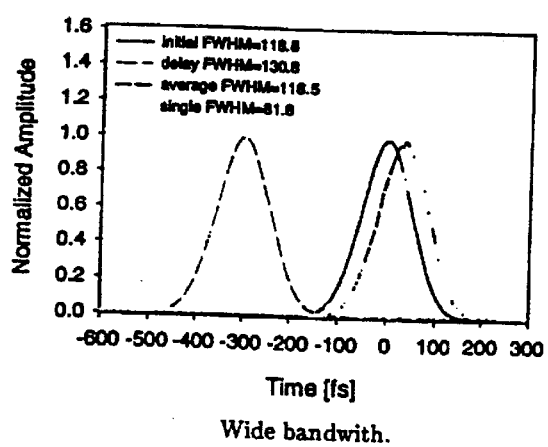
Figure 18A:
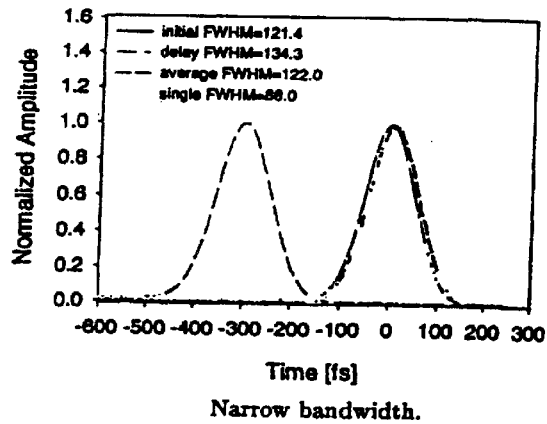
FIGS. 18A–18C are graphs showing pulse length results for Experiment 1 (Day 2 data)
Figure 18B:
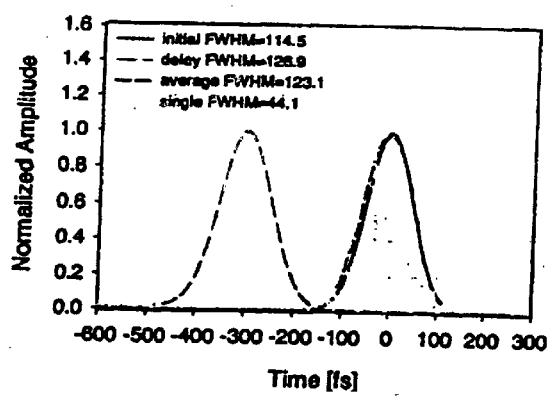
Figure 18C:
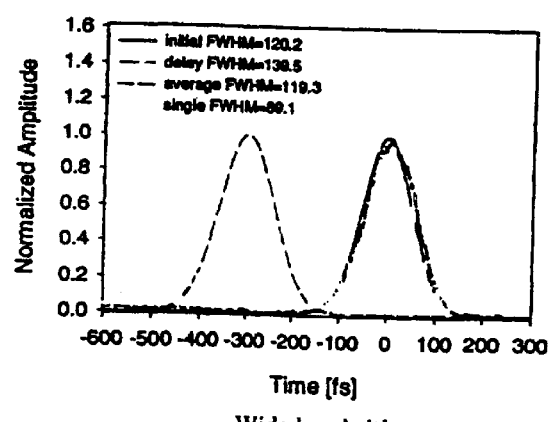
Figure 19A:
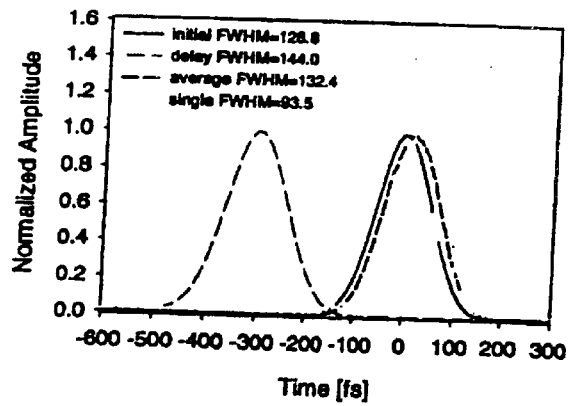
FIGS. 19A–19C are graphs showing pulse length results for Experiment 1 (Day 3 data)
Figure 19B:
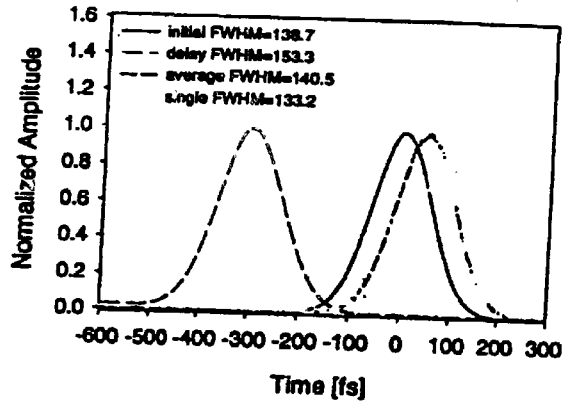
Figure 19C:
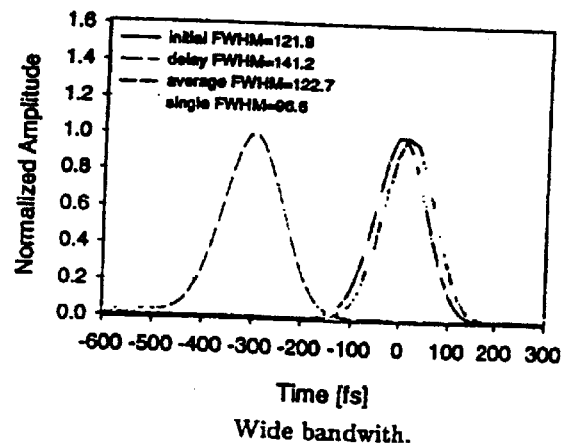

Traditional theory regarding the propagation of an electromagnetic wave through an aerosol consisting of spherical particles is based upon the assumption that multiple scattering is negligible, i.e., light scattered from one particle is independent from the other particles surrounding it. If this is the case, then the transmission through a distance L is exponentially attenuated according to the formula $$\frac{I_t}{I_i} = e^{-\alpha_{ext} L}, \tag{1}$$

where $I_i$ is the incident power, $I_t$ is the transmitted power, and $\alpha_{ext}$ is the attenuation coefficient. For a monochromatic wave, the attenuation coefficient in its most general form may be written $$\alpha_{ext} = \int_{a_{min}}^{a_{max}} Q_{sca}(\varepsilon, 2\pi a) f(a) a^2 da, \tag{2}$$

where N is the particle number density per unit volume, $\lambda$ is the wavelength, a is the particle radii, $Q_{sca}$ is the scattering efficiency, f(a) represents the particle size probability density function, and E represents the dielectric constant of the scattering medium. The scattering efficiency term is derived from Mie-Lorentz scattering theory for continuous incident waves so its applicability to femtosecond pulses now used must be questioned. Plots of the theoretical scattering efficiency as a function of the optical size parameter $2\pi a/\lambda$ are shown in FIG. 4A and as a function of particle diameter (at a wavelength of 800 nm) is shown in FIG. 4B. For a wavelength of 800 nm and particle diameter of 4 $\mu$m, the scattering efficiency has a value of approximately two and one-half. This quantity behaves similarly to an underdamped system, approaching the steady state of 2 as the optical size parameter becomes larger. If $Q_{sca}$ is taken as a constant then the integral $$\int_{a_{min}}^{a_{max}} f(a) a^2 da$$

in Eq. (2) would represent the second moment or area mean of the particle distribution. In this case then Eq. (1) may be expressed as $$\frac{I_t}{I_i} = e^{-Q_{sca} N \bar{a}^2}, \tag{3}$$

where $\bar{a}$ is the area mean radius. This equation is used to compare the results obtained in the data section for both continuous and pulsed femtosecond transmission through aerosol sprays.

The variation of $Q_{sca}$ with wavelength also has implications in regards to obtaining uniform frequency propagation through aerosol sprays along with transmission effects. For low optical size parameters, $Q_{sca}$ is small resulting in higher power transmission but has a sharp gradient which attenuates the shorter wavelengths of the spectrum more than the longer wavelengths. For optical size parameters greater than 15, where $Q_{sca}$ is nearly constant, the attenuation is greater but all wavelengths in a pulse will propagate nearly equally. For monochromatic waves, the effect of a particle size distribution rather than single size particles has the effect of smoothing the ripple structure found in the attenuation coefficient calculations.

3. Experimental Setup and Procedures

The experimental studies consisted of measuring the transmitted power, temporal pulse length, and frequency spectrum through a fixed path length of aerosol spray for both femtosecond pulses and continuous wave transmission. The final data presented consisted of measuring these properties while varying the bandwidth (or pulse length) of the laser light. The particle number density of the aerosol spray was also varied.

3.1 Experimental Setup

Figure 3:
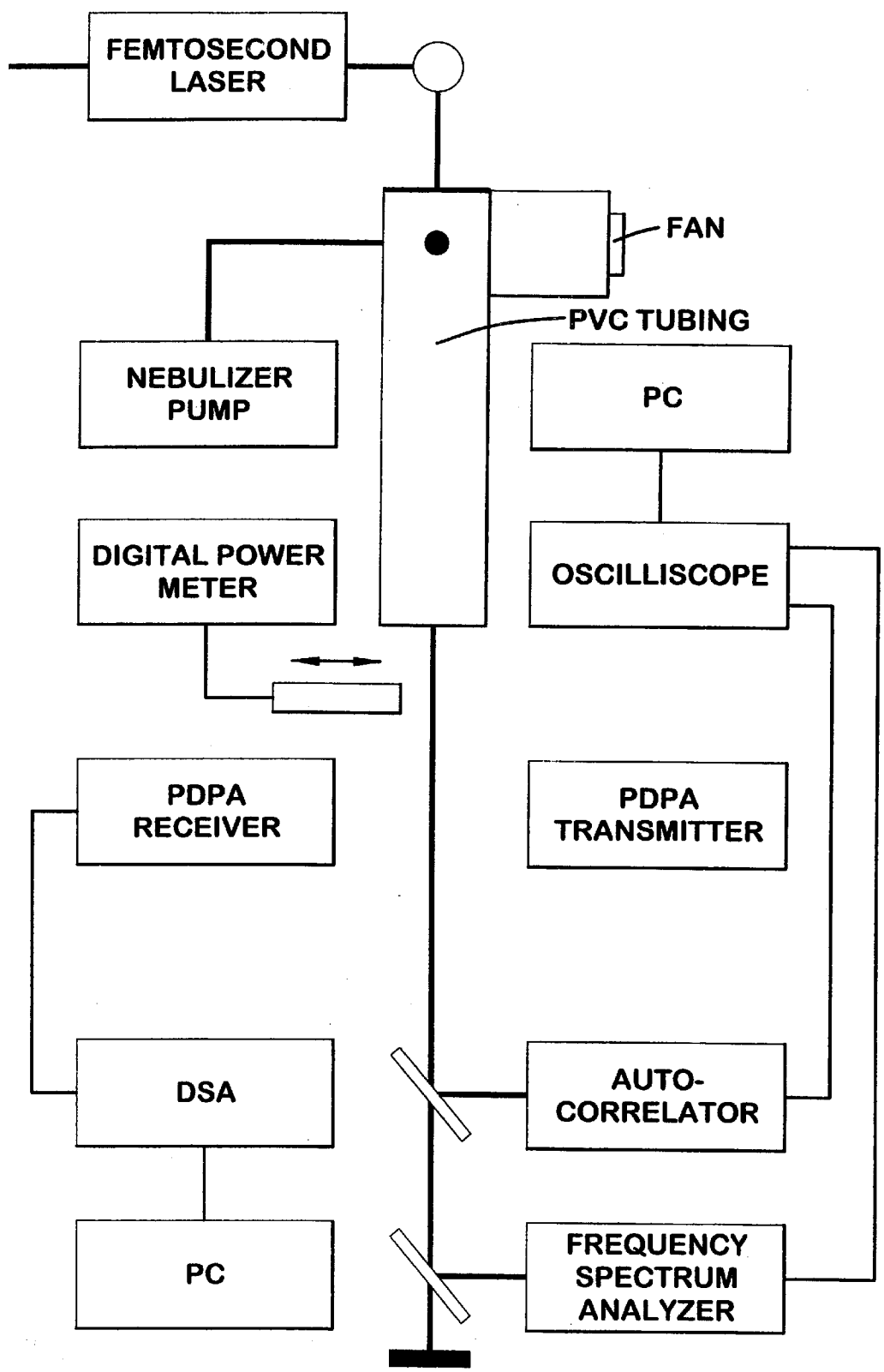
FIG. 3 shows a schematic of an experimental setup.

A schematic of the experimental setup is shown in FIG. 3. The aerosol spray was generated by a Schuco Model 2000 air pump connected to a standard bronchial nebulizer filled with tap water. The aerosol spray was directed through 26 cm of PVC tubing, closed on one end except for a small opening in order to allow the laser pulse through. An Aerometrics Model XMT 1145 Phase Doppler Particle Analyzer (PDPA) was used to measure the spray characteristics at the exit of the tube. Femtosecond pulses generated by a Model 3941-MIS-USP Spectra-Physics Tsunami tunable laser system were directed along the length of the tube in the aerosol spray. A Molectron PM5200 digital power meter was used to measure the light intensity. A Spectra-Physics Model 409-08 autocorrelator, modified for measuring femtosecond pulses, was used to measure the pulse length in the time domain. A Rees Model E202 laser spectrum analyzer (LSA) measured the frequency spectrum in terms of the wavelength of the pulse. Additionally, in order to generate lower particle number densities in some experiments, a Radio Shack Model 273-240 DC microfan was placed on the end of the PVC tubing so more air was introduced to the aerosol mixture being generated from the nebulizer. The entire experimental apparatus was located on a 4 ft by 12 ft Newport Research Optical table. The table was surrounded with curtains and covered with plastic to diminish air currents which could have affected the PDPA velocity measurements. Velocity measurement are critical to the PDPA number density calculations in that they are utilized in the algorithms to determine the total volume or aerosol spray passing through the fixed probe area.

3.2 Procedures

Two basic groups of experiments were performed. The purpose of the first experiment was to observe differences in the forward scattering characteristics between pulses of varying frequency bandwidth, or time duration. A second group of experiments were performed to compare femtosecond pulse and continuous wave power transmission characteristics for varying densities of the aerosol spray. Three basic parameters were measured: the time duration of the transmitted pulse, the frequency spectrum of the transmitted pulse, and the amount of power of the pulse transmitted through the spray. The data for these three parameters were stored numerically and processed off line on a PC computer. The individual details of how each were measured and how the data was analyzed will be explained after a general overview of the experiments performed. The center wavelength of the laser was selected to be 800 nm since atmospheric transmission is a maximum around that wavelength.

Four bandwidth sets were selected in the first group of experiments: wide, narrow, medium, and continuous wave. After the laser was adjusted to the desired bandwidth by adding glass through a prism pair inside the laser cavity, the wavelength spectrum data of the laser pulse was taken without and then with aerosol spray in the PVC tube. Next, autocorrelation data was taken without and with aerosol spray in the tube. Power measurements were then carried out for each of these four cases. The bandwidth and autocorrelation measurements were skipped for the continuous wave case since they were not applicable.

In the second set of experiments, the density of the aerosol spray was varied by placing a small fan on the entrance end of the PVC tube. There were three aerosol density settings. These are referred to as "full spray" where the fan was not turned on, "light spray" where the fan was at a maximum resulting in the lowest particle density, and "medium spray" where the fan speed was in between the two extremes. Approximately four-fifths of the exit end of the tube had to be covered when the fan was turned on in order to obtain a particle concentration large enough to produce enough signals for the PDPA. Covering the end served the purpose of confining the water particles to a smaller exit area. As a result, it also produced much larger flow velocities. Two bandwidth cases were performed: continuous wave and pulsed propagation. The bandwidth of the femtosecond laser pulse was not varied as in the first experiment. Frequency and autocorrelation measurements were taken for the pulse case (continuous wave cases were not applicable). Power measurements were taken for both the femtosecond pulse and continuous wave cases in all experiments.

The frequency spectrum was measured by connecting two channels and a trigger output of the Rees laser spectrum analyzer to the HP Model 54601B oscilloscope. Channel #1 represented the frequency amplitude data while Channel #2 represented visual calibration markers containing the wavelength information. Averaging over 256 data traces could be automatically performed within the oscilloscope to reduce the effects of noise. This was particularly beneficial when the laser beam was transmitted through the spray. This averaging, however, smeared the data markers in the wavelength channel. Therefore, two sets of data were recorded, one without averaging (referred to in the data with the "single" shot) and one with averaging (referred to simply as "averaged"). Raw oscilloscope data was saved as csv (comma separated value) computer files using HP benchlink software. From these files, the frequency amplitude data was found as a function of wavelength, normalized to values between zero and one, and the full width at half maximum (FWHM) was found numerically using a computer program written in the Fortran 90 language. The data contains the averaged and the non-averaged "single" shot results for when aerosol spray occupied space in the tube and when the tube was empty.

The time duration of the femtosecond pulses were measured by connecting the output and the external trigger lead of the Spectra-Physics Model 409-08 autocorrelator to the oscilloscope. Displayed on the single channel was the autocorrelation amplitude as a function of position on the oscilloscope. In order to convert this position in terms of time, the autocorrelator is equipped with a calibration etalon which serves to shift the autocorrelation amplitude on the oscilloscope display an amount which corresponds to 300 fs. Autocorrelation traces of amplitude versus time may then be calibrated by correlating the 300 is delay to the amount of position shift on the oscilloscope. Again, averaging of 256 traces was automatically performed by the oscilloscope to reduce noise.

The change in pulse length through an aerosol spray involved obtaining four traces on the oscilloscope and saving each of these as comma separated value files. The first trace (referred to as "initial") was an averaged autocorrelation reading without any spray in the tube. The purpose of this measurement was twofold: 1) the result was used as a reference to compare similar femtosecond pulses which did travel through an aerosol spray, and 2) it was used in the calibration procedure to calculate the pulse length in terms of femtoseconds. The second reading (referred to as "delay") was the reading without any spray in the tube and the calibration etalon inserted in the autocorrelator beam path. The resulting time delay of 300 fs translated to a shift on the oscilloscope display so the horizontal pulse positions of the first and second readings could be compared to express the amplitude as a function of time. Along with the horizontal shift on the oscilloscope display, the calibration etalon also caused dispersion of the pulse resulting in temporal stretching and consequently large FWHM values. The last two readings were for the tube containing spray, one with the 256 point averaging performed (referred to as "average") and the other without averaging (referred to as "single" shot). The raw data was converted to time scales using Fortran 90 algorithms which also normalized the time amplitudes and calculated the time pulse FWHMs.

Power transmission through the tube consisted of collecting eight individual readings from a Molectron PM5200 digital power meter for a fixed length of time. This time was determined by the duration it took the PDPA to collect the aerosol spray data—typically 40 to 60 seconds. The first and last readings were taken without aerosol spray in the tube, while the six middle readings were taken with aerosol spray in the tube. The data was saved to files on the computer. The power meter sampling period ranged from 0.2 to 0.3 seconds. A hard copy of the PDPA data output screens for each or the six runs was printed so the statistical results containing the aerosol number density, particle diameter statistics, and particle velocity could be put in tabular form. Six separate runs were taken in order to correlate the power transmission with the number density and particle size. The percent transmission for each of the six runs was determined by taking the average power for each run divided by the average of the first and last readings (when no spray was in the tube).

The procedures and the resulting data presented in this final report were selected after completing exploratory experiments. The experiments included in this report are representative of previous efforts but were more systematically performed to minimize statistical variation (e.g., removal of air currents by enclosing the experimental apparatus areas).

4 Data and Analysis

This section is divided into three categories: bandwidth effects, pulse length effects, and power transmission effects.

4.1 Bandwidth Considerations

This section presents the results on the frequency bandwidth observed after femtosecond pulses have propagated through a dense aerosol spray. The results of the first experiment are shown in FIGS. 5A–13D. The changes in bandwidth are shown for narrow, medium, and wide initial frequency spectrums. The graphical results are grouped according to the three respective days in which the final experimental data was collected over three days. In each of the figures, four graphs are shown. The top two, denoted A and B, show the non-averaged and averaged frequency spectrum without any spray in the tube. The bottom two, denoted C and D, show the non-averaged and averaged frequency spectrum when the aerosol spray was present. The numerically calculated center frequency and FWHM are displayed on each of the graphs in the upper right corner. Oscilloscope averaging decreases the effects of noise and produces a smoother curve, thus giving a better FWHM estimate. The non-averaged or "single" graphs do not produce such a smooth spectrum plot. This is apparently not due to the actual signal signature, but rather due to noise in the detector. This statement is supported by the observation that as the signal power into the Rees laser spectrum analyzer is increased, the spectrum becomes more like the averaged signals.

From a visual inspection of FIGS. 5A–13D, it can be seen that the pulse frequency spectrum is essentially preserved even through propagation in a very dense aerosol spray. The numerical results are summarized in Table 1. The FWHM data for the cases when the spray is and is not present are shown along with the percent change. Also reported are the number density for the area mean radius of the aerosol particles as given by the PDPA. On the average, there is a −0.53% change in the FWHM results. There does not appear to be a correlation between pulse bandwidth narrowing and number density or area mean radius.

TABLE 1

Experiment 1: Bandwidth Changes.

| | no spray bandwidth [nm] | spray bandwidth [nm] | % change | number density N [#/cm$^3$] | area mean a [μm] |
|---|---|---|---|---|---|
| Day 1 | | | | | |
| narrow | 12.0 | 11.8 | −1.67 | 132,000 | 2.45 |
| medium | 20.5 | 19.9 | −2.93 | 144,000 | 2.55 |
| wide | 25.8 | 26.4 | 2.10 | 154,000 | 2.45 |
| Day 2 | | | | | |
| narrow | 12.6 | 12.8 | 1.75 | 192,000 | 2.54 |
| medium | 16.1 | 16.0 | −0.42 | 169,000 | 2.55 |
| wide | 24.5 | 23.9 | −2.64 | 173,000 | 2.56 |
| Day 3 | | | | | |
| narrow | 12.0 | 11.9 | −0.78 | 145,000 | 2.60 |
| medium | 16.8 | 16.9 | 0.66 | 118,000 | 2.59 |
| wide | 25.4 | 25.2 | −0.88 | 185,000 | 2.58 |

The results of the second set of experiments are shown graphically in FIGS. 14A–16D. In this experiment air was added to the air-water nebulizer mixture in order to lower the particle density concentration. Three data sets were run which are referred to as full spray (in which no air was added), medium spray, and light spray. The exit area of the PVC tube was reduced in size, resulting in greater particle velocities and better air-water mixing. This produced lower number densities. It is important to point out that particle number densities in typical clouds are closer to 200–500 particles/cc with a mean diameter of 12 μm.

The results of this second experiment are summarized in Table 2. The FWHM data when the spray is present and when it is not present are shown along with the percent change. Also shown is the number density and the area mean radius of the aerosol particles as given by the PDPA. There is a 0.14% change in the FWHM on the average. There appears to be a correlation between pulse bandwidth spreading and number density. However, given only three samples and the small amount of percentage changes, this correlation may not be statistically significant. Consistent with the first experiment, there is minimal change in the frequency spectrum shape or FWHM. As the number density decreases it is obvious from the figures that the signal becomes quite smooth before averaging.

TABLE 2

Experiment 2: Bandwidth Changes.

| | no spray bandwidth [Thz] | spray bandwidth [THz] | % change | number density N [#/cm] | area mean a [μm] |
|---|---|---|---|---|---|
| full spray | 13.7 | 14.1 | 2.82 | 71,000 | 2.60 |
| medium spray | 13.5 | 13.4 | −0.97 | 18,500 | 2.45 |
| light spray | 13.5 | 13.3 | −1.33 | 6,000 | 2.15 |

4.2 Pulse Length Changes

The results of the change in pulse length as a femtosecond laser beam is transmitted through dense aerosol sprays are presented in this section. Again the graphical results for the first experiment are grouped by date and for the narrow, medium, and wide bandwidth cases. Each is shown in FIGS. 17A–19C. Each graph contains four plots labeled initial, delay, average, and single. The "initial" plot represents the autocorrelation of the pulse not transmitted through the aerosol spray. The "delay" plot also represents the autocorrelation of the pulse transmitted through only air, except it is offset from the initial due to the calibration etalon of the autocorrelator inserted into one of the beam paths. This offset is set to 300 fs as indicated on the graphs. Both the initial and delay were averaged in the oscilloscope using 256 traces. The single" and "average" labels respectively represent the non-averaged and averaged autocorrelation plot of the pulse after it has passed through the aerosol spray. It should be noted that the autocorrelation process produces a pulse width which is wider than the actual input pulse. For a secant square pulse type of the Tsunami laser, the pulse width should be multiplied by a factor of 0.65 in order to obtain the true pulse width. The pulse length results for the first experiment are shown in Table 3. The table reflects the changes after the correction factor was applied. It can be seen that there is very little pulse stretching taking place.

TABLE 3

Experiment 1: Pulsewidth Changes.

| | no spray pulsewidth [fs] | spray pulsewidth [fs] | % change | number density N [#/cm³] | area mean a [μm] |
|---|---|---|---|---|---|
| Day 1 | | | | | |
| narrow | 79.63 | 82.49 | 3.59 | 132,000 | 2.45 |
| medium | 80.97 | 85.46 | 5.54 | 144,000 | 2.55 |
| wide | 77.20 | 77.02 | −0.22 | 154,000 | 2.45 |
| Day 2 | | | | | |
| narrow | 78.94 | 79.31 | 0.47 | 192,000 | 2.54 |
| medium | 74.45 | 80.01 | 7.48 | 169,000 | 2.55 |
| wide | 78.14 | 77.54 | −0.78 | 173,000 | 2.56 |
| day 3 | | | | | |
| narrow | 83.74 | 86.08 | 2.80 | 145,000 | 2.60 |
| medium | 90.16 | 91.30 | 1.26 | 118,000 | 2.59 |
| wide | 79.26 | 79.73 | 0.60 | 185,000 | 2.58 |

Figure 20A:
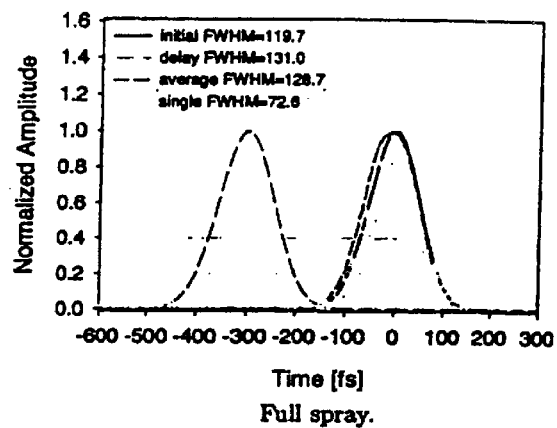
FIGS. 20A–20C are graphs showing pulsewidth results for Experiment 2.
Figure 20B:
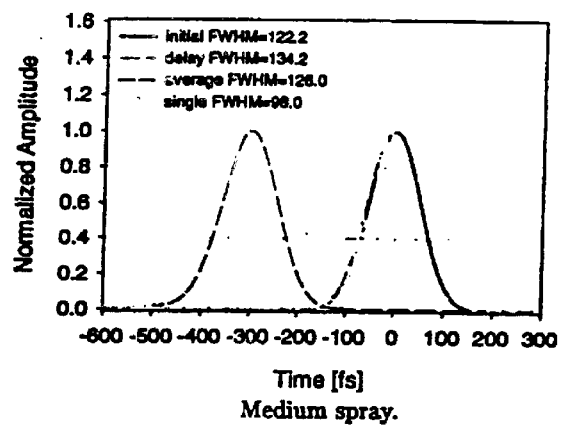
Figure 20C:
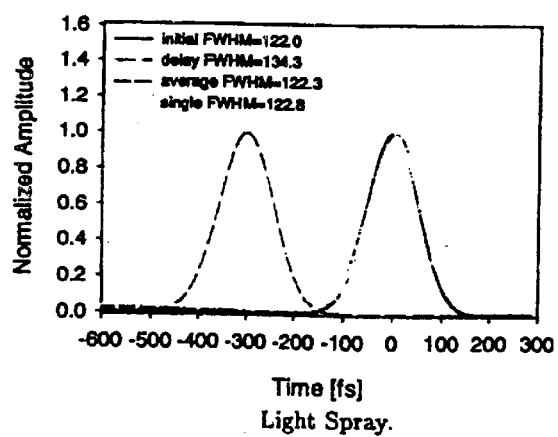

The results of the second experiment are shown graphically in FIG. 20 and summarized in Table 4. It can be seen from the second experiment results that a less dense spray produces a clearer pulse width signal without averaging. There also is a correlation with the pulse stretching and number density, the less dense the spray the less pulse stretching (dispersion) occurs.

TABLE 4

Experiment 2: Pulsewidth Change Summary.

| | no spray pulsewidth [fs] | spray bandwidth [fs] | % change | number density N [#/cm] | area mean a [μm] |
|---|---|---|---|---|---|
| full spray | 77.82 | 83.62 | 7.46 | 71,000 | 2.60 |
| medium spray | 79.42 | 81.88 | 3.10 | 18,500 | 2.45 |
| light spray | 79.27 | 79.51 | −1.33 | 6,000 | 2.86 |

5 Power Transmission

In both sets of experiments, the power transmission was measured six times over a period of 40 to 60 seconds. The PDPA was used to measure the spray characteristics during each of the six runs. The results for the first experiment are shown in Tables 5–7 for the four cases of continuous wave, narrow bandwidth, medium bandwidth, and wide bandwidth. The results for the second experiment are shown in Tables 8–10. These tables list the percent transmission, number density, area mean diameter, velocity, and the QL constant for each run. The tables also list the average $$\bar{x} = \frac{1}{N} \sum_{1}^{N} x_i \quad (4)$$

and the average deviation $$\sigma = \frac{1}{N} \sum_{1}^{N} |x_i - \bar{x}_i| \quad (5)$$

for each of these quantities.

Power transmission rates varied over time from run to run while all system components were kept the same. The PDPA data indicated that the aerosol spray properties changed. In order to incorporate this variability into the femtosecond pulse and continuous wave transmission comparison, the traditional power transmission theory (Eq. (3)) was utilized. To compensate for the fact that the number density and area mean diameter were changing, it was assumed that the scattering coefficient $Q_{sca}$ and length L would be constant over each of the runs. The assumption that $Q_{sca}$ was constant is justified in that over the possible diameter ranges at 800 nm, its range was bounded between one and four. The distribution of the particle sizes would also serve to limit this possible range by averaging out the variations with particle diameter and laser wavelength. The tube length was fixed and the assumption that the path length L was constant is based on this fact. The variables $Q_{sca}$ and L in Eq. (3) were combined as one variable QL. This variable was solved for in Eq. (3) and included as part of the results. Lower values of QL would result in higher transmission rates.

TABLE 5

Experiment 1: Power Transmission Data (Day 1).

| Day 1 | 1 | 2 | 3 | 4 | 5 | 6 | avg | dev |
|---|---|---|---|---|---|---|---|---|
| cw | | | | | | | | |
| % transmission | 8.0 | 8.7 | 9.0 | 9.1 | 9.3 | 9.6 | 8.92 | 0.41 |
| # density [× $10^5$] | 1.34 | 1.60 | 1.57 | 1.50 | 1.40 | 1.32 | 1.46 | 0.10 |
| area mean diam. [μm] | 4.4 | 4.3 | 4.3 | 4.3 | 4.2 | 4.2 | 4.28 | 0.06 |
| velocity [cm/s] | 9.4 | 9.1 | 9.2 | 9.8 | 9.1 | 9.5 | 9.35 | 0.22 |
| QL calc. | 102.8 | 82.6 | 76.8 | 83.6 | 84.6 | 82.3 | 85.5 | 5.78 |
| narrow | | | | | | | | |
| % transmission | 11.5 | 12.2 | 12.6 | 12.3 | 13.0 | 12.7 | 12.4 | 0.38 |
| # density [× $10^5$] | 1.03 | 1.35 | 1.49 | 1.33 | 1.39 | 1.33 | 1.32 | 0.10 |
| area mean diam. [μm] | 5.1 | 4.9 | 4.8 | 4.9 | 4.7 | 4.9 | 4.88 | 0.09 |
| velocity [cm/s] | 9.4 | 9.1 | 9.2 | 9.8 | 9.1 | 9.5 | 9.35 | 0.22 |
| QL calc. | 102.8 | 82.6 | 76.8 | 83.6 | 84.6 | 82.3 | 85.5 | 5.78 |
| medium | | | | | | | | |
| % transmission | 7.7 | 8.5 | 9.2 | 9.4 | 9.4 | 9.3 | 8.92 | 0.56 |
| # density [× $10^5$] | 1.57 | 1.65 | 1.42 | 1.31 | 1.24 | 1.42 | 1.44 | 0.12 |
| area mean diam. [μm] | 5.2 | 5.1 | 5.1 | 5.2 | 5.0 | 5.0 | 5.10 | 0.07 |
| velocity [cm/s] | 10.1 | 10.2 | 10.0 | 9.7 | 10.2 | 10.3 | 10.1 | 0.16 |
| QL calc. | 77.0 | 73.2 | 82.2 | 85.0 | 97.0 | 85.2 | 83.27 | 5.81 |
| wide | | | | | | | | |
| % transmission | 7.8 | 8.0 | 8.3 | 8.2 | 8.2 | 8.4 | 8.16 | 0.20 |
| # density [× $10^5$] | 1.67 | 1.44 | 1.52 | 1.55 | 1.49 | 1.56 | 1.54 | 0.06 |
| area mean diam. [μm] | 4.9 | 5.1 | 4.9 | 4.9 | 4.9 | 4.7 | 4.90 | 0.07 |
| velocity [cm/s] | 9.8 | 9.9 | 9.8 | 10.2 | 10.4 | 9.7 | 9.97 | 0.22 |
| QL calc. | 81.1 | 86.0 | 86.7 | 85.4 | 88.8 | 91.4 | 86.6 | 2.40 |

TABLE 6

Experiment 1: Power Transmission Data (Day 2 Data).

| Day 2 | 1 | 2 | 3 | 4 | 5 | 6 | avg | dev |
|---|---|---|---|---|---|---|---|---|
| cw | | | | | | | | |
| % transmission | 9.8 | 10.5 | 11.0 | 11.7 | 12.5 | 11.5 | 11.2 | 0.74 |
| # density [× $10^5$] | 1.64 | 1.53 | 1.44 | 1.58 | 1.68 | 1.69 | 1.59 | 0.08 |
| area mean diam. [μm] | 4.2 | 4.3 | 4.1 | 4.0 | 4.1 | 4.1 | 4.13 | 0.08 |
| velocity [cm/s] | 7.7 | 8.0 | 7.7 | 7.7 | 7.4 | 8.3 | 7.80 | 0.23 |
| QL calc. | 72.2 | 72.1 | 81.3 | 75.0 | 68.4 | 67.9 | 72.8 | 3.56 |
| narrow | | | | | | | | |
| % transmission | 6.0 | 5.6 | 5.9 | 6.0 | 6.4 | 7.2 | 6.17 | 0.42 |
| # density [× $10^5$] | 1.94 | 1.85 | 2.14 | 1.77 | 1.94 | 1.87 | 1.92 | 0.09 |
| area mean diam. [μm] | 5.1 | 5.2 | 4.9 | 5.2 | 5.1 | 5.0 | 5.08 | 0.09 |
| velocity [cm/s] | 9.8 | 9.8 | 9.3 | 9.4 | 9.3 | 8.8 | 9.40 | 0.27 |
| QL calc. | 71.2 | 73.5 | 70.1 | 75.0 | 69.2 | 71.7 | 71.8 | 1.62 |
| medium | | | | | | | | |
| % transmission | 6.7 | 7.1 | 8.0 | 8.6 | 8.6 | 8.3 | 7.88 | 0.64 |
| # density [× $10^5$] | 1.76 | 1.52 | 1.66 | 1.75 | 1.82 | 1.62 | 1.69 | 0.09 |
| area mean diam. [μm] | 5.2 | 5.3 | 5.1 | 5.1 | 4.9 | 5.0 | 5.10 | 0.10 |
| velocity [cm/s] | 8.7 | 9.7 | 8.9 | 9.0 | 8.8 | 9.8 | 9.15 | 0.40 |
| QL calc. | 72.3 | 78.8 | 74.4 | 68.8 | 71.5 | 78.3 | 74.0 | 3.16 |
| wide | | | | | | | | |
| % transmission | 8.1 | 8.1 | 8.5 | 8.2 | 7.7 | 7.7 | 8.04 | 0.26 |
| # density [× $10^5$] | 1.77 | 1.73 | 1.73 | 1.66 | 1.78 | 1.72 | 1.73 | 0.03 |
| area mean diam. [μm] | 5.2 | 5.2 | 5.1 | 5.1 | 5.1 | 5.0 | 5.12 | 0.06 |
| velocity [cm/s] | 8.5 | 8.9 | 8.4 | 9.3 | 9.4 | 9.0 | 8.92 | 0.32 |
| QL calc. | 66.8 | 68.4 | 69.7 | 73.8 | 70.7 | 76.1 | 70.91 | 2.70 |

TABLE 7

Experiment 1: Power Transmission Data (Day 3 Data).

| Day 1 | 1 | 2 | 3 | 4 | 5 | 6 | avg | dev |
|---|---|---|---|---|---|---|---|---|
| cw | | | | | | | | |
| % transmission | 10.9 | 11.0 | 11.6 | 12.1 | 12.2 | 11.1 | 11.5 | 0.48 |
| # density [× $10^5$] | 1.05 | 1.13 | 0.90 | 1.05 | 1.08 | 1.10 | 1.05 | 0.05 |
| area mean diam. [μm] | 5.3 | 5.5 | 5.1 | 4.9 | 5.0 | 5.0 | 5.13 | 0.18 |
| velocity [cm/s] | 8.1 | 8.4 | 7.9 | 8.5 | 8.2 | 8.9 | 8.33 | 0.27 |
| QL calc. | 95.7 | 82.2 | 117.6 | 106.7 | 99.2 | 101.8 | 100.5 | 8.15 |
| narrow | | | | | | | | |
| % transmission | 11.4 | 11.7 | 11.9 | 11.6 | 11.3 | 10.7 | 11.4 | 0.30 |
| # density [× $10^5$] | 1.69 | 1.48 | 1.18 | 1.58 | 1.18 | 1.57 | 1.45 | 0.18 |
| area mean diam. [μm] | 5.1 | 4.9 | 5.6 | 4.9 | 5.5 | 5.2 | 5.20 | 0.23 |
| velocity [cm/s] | 7.1 | 7.5 | 8.0 | 7.8 | 7.7 | 8.8 | 7.82 | 0.39 |
| QL calc. | 62.9 | 76.9 | 73.2 | 72.3 | 77.8 | 67.0 | 71.7 | 4.48 |
| medium | | | | | | | | |
| % transmission | 11.2 | 11.8 | 12.1 | 12.2 | 12.2 | 12.6 | 12.0 | 0.34 |
| # density [× $10^5$] | 1.42 | 1.18 | 1.07 | 1.05 | 1.29 | 1.06 | 1.18 | 0.12 |
| area mean diam. [μm] | 5.3 | 5.5 | 5.2 | 5.2 | 4.9 | 5.0 | 5.18 | 0.16 |
| velocity [cm/s] | 7.8 | 8.1 | 8.8 | 8.4 | 8.6 | 8.9 | 8.43 | 0.33 |
| QL calc. | 69.9 | 76.2 | 92.9 | 94.3 | 86.5 | 99.5 | 86.6 | 9.04 |
| wide | | | | | | | | |
| % transmission | 9.5 | 10.2 | 10.3 | 10.7 | 11.0 | 11.2 | 10.49 | 0.48 |
| # density [× $10^5$] | 1.82 | 1.99 | 1.65 | 1.79 | 2.11 | 1.75 | 1.85 | 0.13 |
| area mean diam. [μm] | 5.3 | 5.3 | 5.2 | 5.0 | 5.0 | 5.1 | 5.15 | 0.12 |
| velocity [cm/s] | 7.2 | 6.7 | 7.7 | 7.0 | 6.8 | 6.8 | 7.03 | 0.28 |
| QL calc. | 58.5 | 52.0 | 64.9 | 63.6 | 53.3 | 61.2 | 58.9 | 4.31 |

TABLE 8

Experiment 2: Power Transmission Data (Full Spray)

| | 1 | 2 | 3 | 4 | 5 | 6 | avg | dev |
|---|---|---|---|---|---|---|---|---|
| FULL SPRAY | | | | | | | | |
| cw | | | | | | | | |
| % transmission | 12.0 | 12.8 | 12.9 | 13.2 | 13.5 | 13.4 | 13.0 | 0.40 |
| # density [× $10^5$] | 0.72 | 0.70 | 0.72 | 0.69 | 0.71 | 0.70 | 0.71 | 0.01 |
| area mean diam. [μm] | 5.7 | 5.5 | 5.2 | 5.1 | 4.9 | 4.9 | 5.22 | 0.26 |
| velocity [cm/s] | 24.5 | 23.3 | 23.3 | 23.7 | 23.7 | 23.1 | 23.6 | 0.37 |
| QL calc. | 114.9 | 124.5 | 133.4 | 144.1 | 149.6 | 151.4 | 136.3 | 12.0 |
| pulse | | | | | | | | |
| % transmission | 7.6 | 8.8 | 9.2 | 9.4 | 9.6 | 9.5 | 9.01 | 0.56 |
| # density [× $10^5$] | 0.70 | 0.71 | 0.73 | 0.71 | 0.72 | 0.71 | 0.71 | 0.01 |
| area mean diam. [μm] | 5.5 | 5.3 | 5.3 | 5.2 | 5.0 | 4.9 | 5.20 | 0.17 |
| velocity [cm/s] | 24.8 | 24.0 | 23.7 | 23.3 | 23.3 | 23.5 | 23.8 | 0.42 |
| QL calc. | 154.7 | 155.5 | 148.3 | 157.6 | 166.2 | 176.4 | 159.8 | 7.68 |

TABLE 9

Experiment 2: Power Transmission Data (Medium Spray)

| | 1 | 2 | 3 | 4 | 5 | 6 | avg | dev |
|---|---|---|---|---|---|---|---|---|
| MEDIUM SPRAY | | | | | | | | |
| cw | | | | | | | | |
| % transmission | 38.7 | 37.1 | 37.2 | 37.1 | 37.3 | 39.3 | 37.8 | 0.81 |
| # density [× $10^5$] | 0.17 | 0.16 | 0.13 | 0.12 | 0.11 | 0.11 | 0.13 | 0.02 |
| area mean diam. [μm] | 4.9 | 4.7 | 4.8 | 4.9 | 4.8 | 4.8 | 4.82 | 0.06 |
| velocity [cm/s] | 57.2 | 56.8 | 56.9 | 57.5 | 57.1 | 57.1 | 57.1 | 0.17 |
| QL calc. | 296.1 | 350.6 | 437.2 | 438.2 | 482.3 | 465.0 | 411.6 | 58.8 |

TABLE 9-continued

Experiment 2: Power Transmission Data (Medium Spray)

| | 1 | 2 | 3 | 4 | 5 | 6 | avg | dev |
|---|---|---|---|---|---|---|---|---|
| pulse | | | | | | | | |
| % transmission | 41.5 | 42.4 | 42.6 | 41.3 | 41.4 | 41.8 | 41.8 | 0.44 |
| # density [× $10^5$] | 0.093 | 0.091 | 0.085 | 0.072 | 0.070 | 0.070 | 0.08 | 0.01 |
| area mean diam. [μm] | 5.0 | 4.8 | 4.8 | 5.0 | 4.9 | 4.9 | 4.90 | 0.07 |
| velocity [cm/s] | 66.1 | 63.8 | 63.2 | 62.9 | 63.7 | 64.7 | 64.1 | 0.89 |
| QL calc. | 484.2 | 519.9 | 554.8 | 625.5 | 667.1 | 659.9 | 585.2 | 65.6 |

TABLE 10

Experiment 2: Power Transmission Data (Light Spray)

| | 1 | 2 | 3 | 4 | 5 | 6 | avg | dev |
|---|---|---|---|---|---|---|---|---|
| LIGHT SPRAY | | | | | | | | |
| cw | | | | | | | | |
| % transmission | 50.5 | 58.6 | 56.2 | 55.0 | 55.8 | 54.7 | 55.1 | 1.73 |
| # density [× $10^5$] | 0.069 | 0.051 | 0.045 | 0.051 | 0.050 | 0.043 | 0.050 | 0.01 |
| area mean diam. [μm] | 5.5 | 5.6 | 5.6 | 5.7 | 5.8 | 5.7 | 5.65 | 0.08 |
| velocity [cm/s] | 76.8 | 76.3 | 75.9 | 75.8 | 77.2 | 78.5 | 76.8 | 0.75 |
| QL calc. | 414.4 | 428.8 | 519.9 | 457.6 | 442.5 | 544.8 | 468.0 | 42.9 |
| pulse | | | | | | | | |
| % transmission | 52.9 | 53.0 | 51.9 | 53.8 | 49.5 | 49.2 | 51.7 | 1.58 |
| # density [× $10^5$] | 0.06 | 0.06 | 0.07 | 0.06 | 0.07 | 0.07 | 0.06 | 0.01 |
| area mean diam. [μm] | 5.6 | 5.8 | 5.7 | 5.8 | 5.7 | 5.8 | 5.73 | 0.07 |
| velocity [cm/s] | 76.7 | 75.8 | 76.0 | 79.7 | 74.9 | 76.2 | 76.6 | 1.10 |
| QL calc. | 437.4 | 431.4 | 370.3 | 406.6 | 400.5 | 383.5 | 405.0 | 20.2 |

The results from the first experiment did not show any consistently measurable differences between pulsed and continuous wave laser transmission. The Day 1 data produced QL values within a small range between 82.4 and 86.6 and average deviations over the six runs ranged between 2.4 and 6.3. This would indicate that the power transmission were the same over all bandwidth ranges within experimental error. The Day 2 data resulted in QL values between 70.9 and 74.0, with average deviations between 1.62 and 3.56. The Day 3 Q L values were less consistent when compared with the prior two days with values and average deviations respectively ranging from 58.9 to 100.5 and 4.3 to 9.0. This would indicate that errors were greater on this day than the previous two. However, the data gave no indication that pulsed wave transmission was more beneficial than continuous wave.

The results of the second experiment are less conclusive than those of the first. Unrealistically large QL constants were calculated. This would indicate that either the PDPA system was producing data with significant errors at these large velocities and number densities or that the scattering efficiency greatly changes for less dense sprays. Traditional theory provides no reason for $Q_{sca}$ to change at lower number densities. Rather, since multiple scattering would be less likely, the theory should be more applicable at lower densities. This and the fact the average deviation is very large for both the QL and the percent transmission provide evidence that the PDPA data is somewhat questionable. It should be noted that the exponential function descends steeply at these operating regions, so that small errors in power transmission data would result in large errors in the calculated QL. There is, however, no reason to believe that the errors would favor either the continuous wave or pulsed wave transmission data so that the transmission rates and QL values may still be compared between the two cases. Again, there is no indication in the data that laser pulses would result in better transmission than continuous wave lasers. Two of the three cases resulted in the pulsed wave have lower transmission percentages, but two of the three cases also resulted in lower QL values for the femtosecond pulse laser beam.

6 Conclusion

Experiments were conducted in order to investigate the temporal pulse spreading, frequency spectrum changes, and power transmission characteristics of a laser beam traveling through a dense aerosol spray. It was shown that there is no significant change in the frequency spectrum shape or FWHM over the range of aerosol spray densities tested. There was generally some increase in the temporal pulse length. From the limited number of experiments in which the spray density was varied, it appeared that the greater the number density of the aerosol spray, the greater the change in the measured pulse FWHM. Overall, in the work performed so far, there was no difference in the power transmission data between femtosecond laser pulses and a continuous wave laser propagation. There was also no measurable correlations between the power transmission and frequency bandwidth.

The work performed here through aerosols of $10^5$ particles per cc provides clear evidence that optical communication system and method according to the present invention utilizing frequency spread detection is attractive for atmospheric transmissions up to relatively large distances. It should be pointed out that all frequency and pulse width data is based on splitting off 4% of the transmitted power and thus, the directly detected pulse spread data will be much smoother, even for single shot results.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. Accordingly, the scope of the invention should be determined solely by the appended claims and their legal equivalents.

What is claimed is:

1. An free-space optical communication system for transmitting data from an optical transmitter to an optical receiver, said free-space optical communication system comprising:
   an optical transmitter at a first location, said optical transmitter comprising a femtosecond pulsed laser source for producing a train of femtosecond laser pulses, said pulses having a pulse width in the range of from about 1 attosecond to about 1000 femtoseconds, said optical transmitter further comprising a laser pulse width modulator for modulating the pulse width of said laser pulses to provide a pulse width modulated train of femtosecond laser pulses corresponding to said data being transmitted; and
   an optical receiver at a second location, said optical receiver for receiving said modulated train of femtosecond laser pulses, said optical receiver comprising a spectral analyzer for receiving and determining the spectral components of said pulse width modulated train of femtosecond laser pulses, said optical receiver further comprising decoder circuitry operable to replicate said transmitted data based on said spectral components of said modulated train of femtosecond laser pulses.

2. The free-space optical communication system of claim 1, wherein said first location comprises a first earth-based communications station.

3. The free-space optical communication system of claim 2, wherein said second location comprises a communications satellite.

4. The free-space optical communication system of claim 2 wherein said second location comprises a second earth-based communications station.

5. The free-space optical communication system of claim 1 wherein said first location comprises a first communications satellite.

6. The free-space optical communication system of claim 5 wherein said second location comprises an earth-based communications station.

7. The free-space optical communication system of claim 2 wherein the frequency content of said laser energy pulses comprises frequencies in the visible region.

8. The free-space optical communication system of claim 7 wherein the frequency content of said laser energy pulses comprises frequencies corresponding wavelengths within the range of from about 750 nm to about 850 nm.

9. The free-space optical communication system of claim 1 wherein the pulse repetition frequency is in the range of from about 1 Hz to about 100 MHz.

10. The free-space optical communication system of claim 1 wherein said electrical signal encodes time division multiplexed information.

11. The free-space optical communication system of claim 1 wherein said spectral analyzer comprises an optical multichannel analyzer.

12. An free-space optical transmitter for transmitting data to an optical receiver, said optical transmitter comprising a femtosecond pulsed laser source for producing a train of femtosecond laser pulses, said pulses having a pulse width in the range of from about 1 attosecond to about 1000 femtoseconds, said optical transmitter further comprising a laser pulse width modulator for modulating the pulse width of said laser pulses to provide a pulse width modulated train of femtosecond laser pulses corresponding to said data being transmitted.

13. An free-space optical receiver for receiving data from an optical receiver, said optical receiver comprising a spectral analyzer for receiving and determining the spectral components of said pulse width modulated train of femtosecond laser pulses, said optical receiver further comprising decoder circuitry operable to replicate said transmitted data based on said spectral components of said modulated train of femtosecond laser pulses.

14. A method for communicating information using digitally formatted optical signals, said method comprising the steps of:
   (a) providing a pulse train of laser energy pulses, said pulses having a pulse width in the range of from about 1 attosecond to about 1000 femtoseconds;
   (b) providing a first digitally formatted electrical signal, said digitally formatted electrical signal encoding said information to be communicated;
   (c) converting said first digitally formatted electrical signal into a digitally formatted optical signal, said step of converting comprising modulating said pulse train of laser energy pulses with said first digitally formatted electrical signal to provide a first pulse width modulated optical signal digitally encoding said information to be communicated, said first pulse width modulated optical signal comprising laser energy pulses having a plurality of discrete pulse widths, wherein each of said laser energy pulses comprises a frequency content that is characteristic of pulse width;
   (d) transmitting said first pulse width modulated optical signal from a first location;
   (e) receiving the transmitted first pulse width modulated optical signal transmitted in step (d) at a second location remote from said first location, said receiving step comprising the steps of sensing said transmitted optical signal of step (d), determining the frequency content of said laser energy pulses that comprise said first pulse width modulated optical signal, and determining the pulse width of said laser energy pulses indirectly based on the frequency content of said laser energy pulses;
   (f) converting said received pulse width modulated optical signal of step (e) into a second digitally formatted electrical signal encoding information replicating said information of step b) to be communicated.

15. The communication method of claim 14, wherein said first location comprises a first earth-based communications station.

16. The communication method of claim 15, wherein said second location comprises a communications satellite.

17. The communication method of claim 15, wherein said second location comprises a second earth-based communications station.

18. The communication method of claim 14, wherein said first location comprises a first communications satellite.

19. The communication method of claim 18, wherein said second location comprises an earth-based communications station.

20. The communications method of claim 14, wherein the frequency content of said laser energy pulses comprises frequencies in the visible region.

21. The communications method of claim 20, wherein the frequency content of said laser energy pulses comprises frequencies corresponding wavelengths within the range of from about 750 nm to about 850 nm.

22. The communication method of claim 14, wherein the pulse repetition frequency is in the range of from about 1 Hz to about 100 MHz.

23. The communication method of claim 14, wherein said first digitally formatted electrical signal encoded time division multiplexed information.

24. The communication method of claim 14, wherein said frequency content of said pulse width modulated optical signal is determined by an optical multichannel analyzer.

25. The communication method of claim 15, further including the steps of:

(g) providing a pulse train of laser energy pulses, said pulses having a pulse width in the range of from about 1 attosecond to about 1000 femtoseconds;

(h) providing a third digitally formatted electrical signal, said digitally formatted electrical signal encoding information to be communicated, wherein said information to be communicated may be the same as or different from said information to be communicated of step (b);

(i) converting said third digitally formatted electrical signal to a second digitally formatted optical signal, said step of converting comprising modulating said pulse train of laser energy pulses with said third digitally formatted electrical signal to provide a second pulse width modulated optical signal digitally encoding said information to be communicated from step (h), said second pulse width modulated optical signal comprising laser energy pulses having a plurality of discrete pulse widths, wherein each of said laser energy pulses comprises a frequency content that is characteristic of pulse width;

(j) transmitting said pulse width modulated optical signal from said second location;

(k) receiving the transmitting pulse width modulated optical signal transmitted in step (j) at a location selected from the group consisting of said first location and a third location remote from both said first and second locations, said receiving step comprising the steps of sensing the transmitted optical signal of step (j), determining the frequency content of said laser energy pulses, and determining the pulse width of said laser energy pulses indirectly based on the frequency content of said laser energy pulses; and (l) converting the received pulse width modulated optical signal of step (k) into a fourth digitally formatted electrical signal encoding information replicating said information to be communicated of step (h).

* * * * *